(12) United States Patent
Tong et al.

(10) Patent No.: US 9,712,363 B2
(45) Date of Patent: Jul. 18, 2017

(54) TRANSMITTING CIRCUIT, TRANSCEIVER, COMMUNICATION SYSTEM, AND METHOD FOR TRANSMITTING DATA

(71) Applicant: Huawei Technologies Co., Ltd., Shenzhen (CN)

(72) Inventors: Wen Tong, Ottawa (CA); Guangjian Wang, Chengdu (CN); Huang Huang, Shenzhen (CN); Xi Yan, Shenzhen (CN); Kunpeng Liu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/610,667

(22) Filed: Jan. 30, 2015

(65) Prior Publication Data

US 2015/0139348 A1 May 21, 2015

Related U.S. Application Data

(63) Continuation of application No. PCT/CN2013/076135, filed on May 23, 2013.

(30) Foreign Application Priority Data

Jul. 30, 2012 (CN) .......................... 2012 1 0265353

(51) Int. Cl.
*H04B 7/02* (2017.01)
*H04L 27/26* (2006.01)
(Continued)

(52) U.S. Cl.
CPC ....... *H04L 27/2627* (2013.01); *H04B 1/0007* (2013.01); *H04B 1/0053* (2013.01); *H04B 7/068* (2013.01); *H04L 27/2649* (2013.01)

(58) Field of Classification Search
CPC . H04L 27/2627; H04L 5/003; H04L 27/2649; H04B 1/0007; H04B 1/0053; H04B 7/068
(Continued)

(56) References Cited

U.S. PATENT DOCUMENTS 7,693,429 B1 * 4/2010 Lowery ................ H04B 10/548
398/182
2009/0052556 A1 2/2009 Fernandez
(Continued)

FOREIGN PATENT DOCUMENTS

| CN | 101021561 A | 8/2007 |
| CN | 101741782 A | 6/2010 |

(Continued)

OTHER PUBLICATIONS

Foreign Communication From a Counterpart Application, Chinese Application No. 201210265353.5, Chinese Search Report dated Jun. 25, 2015, 2 pages.

(Continued)

*Primary Examiner* — Dhaval Patel
(74) *Attorney, Agent, or Firm* — Conley Rose, P.C.

(57) ABSTRACT

A transmitting circuit, a transceiver, a communication system, and a method for transmitting data. The transmitting circuit includes a digital interface circuit configured to obtain, in a predetermined bandwidth, data to be sent, and decompose the data into N parallel sub digital signal flows; a digital modulation circuit configured to modulate the N sub digital signal flows to obtain N modulated signals; a frequency relocation circuit configured to perform frequency relocation on the N modulated signals; a synthesizer configured to modulate M modulated signals of the N modulated signals that have undergone frequency relocation into a bandwidth signal; a digital to analog converter configured to receive the bandwidth signal, and perform digital (Continued)

to analog conversion on the bandwidth signal to obtain an analog signal; an up-conversion circuit configured to receive the analog signal, and convert the analog signal into a radio frequency signal.

22 Claims, 15 Drawing Sheets

(51) Int. Cl.
*H04B 7/06* (2006.01)
*H04B 1/00* (2006.01)

(58) Field of Classification Search
USPC .............. 375/267, 295, 259, 316, 146, 219; 370/329, 336, 328, 249, 310, 342, 203, 370/204, 208, 209
See application file for complete search history.

(56) References Cited

U.S. PATENT DOCUMENTS

| | | | |
|---|---|---|---|
| 2010/0142598 A1 | 6/2010 | Murray et al. | |
| 2011/0122972 A1 | 5/2011 | Lie et al. | |
| 2011/0217040 A1* | 9/2011 | Mori | H04J 14/06 398/53 |
| 2012/0087439 A1 | 4/2012 | Zhang | |
| 2012/0140804 A1* | 6/2012 | Corral | H04L 5/0091 375/224 |
| 2012/0269234 A1* | 10/2012 | Zhang | H04L 5/0007 375/143 |
| 2012/0281550 A1* | 11/2012 | Huang | H04B 1/0475 370/249 |
| 2014/0369442 A1 | 12/2014 | Huang et al. | |

FOREIGN PATENT DOCUMENTS

| | | |
|---|---|---|
| CN | 101924729 A | 12/2010 |
| CN | 102098255 A | 6/2011 |
| CN | 102130697 A | 7/2011 |
| CN | 102148789 A | 8/2011 |
| EP | 2019486 A1 | 1/2009 |
| WO | 9621305 A1 | 7/1996 |
| WO | 9907093 A2 | 2/1999 |
| WO | 2006103585 A2 | 10/2006 |
| WO | 2008067584 A1 | 6/2008 |
| WO | 2011063575 A1 | 6/2011 |
| WO | 2011088792 A1 | 7/2011 |

OTHER PUBLICATIONS

Foreign Communication From a Counterpart Application, Chinese Application No. 201210265353.5, Chinese Office Action dated Jul. 3, 2015, 7 pages.
Partial English Translation and Abstract of Chinese Patent Application No. CN102148789A, May 28, 2015, 5 pages.
Zhang, F., et al., "An Agile, Ultra-Wideband Pulse Radio Transceiver With Discrete-Time Wideband-IF," IEEE Journal of Solid-State Circuits, vol. 44, No. 5, May 2009, pp. 1336-1351.
Skolnik, M., et al., "Ultrawideband Microwave-Radar Conceptual Design," IEEE AES Systems Magazine, Oct. 1995, pp. 25-29.
Dyadyuk, V., et al., "A Multigigabit Millimeter-Wave Communication System With Improved Spectral Efficiency," IEEE Transactions on Microwave Theory and Techniques, vol. 55, No. 12, Dec. 2007, pp. 2813-2821.
Hoyos, S., et al., "Ultra-Wideband Analog-to-Digital Conversion Via Signal Expansion," IEEE Transactions on Vehicular Technology, vol. 54, No. 5, Sep. 2005, pp. 1609-1622.
Foreign Communication From A Counterpart Application, PCT Application No. PCT/CN2013/076135, English Translation of International Search Report dated Aug. 29, 2013, 2 pages.
Foreign Communication From A Counterpart Application, PCT Application No. PCT/CN2013/076135, English Translation of Written Opinion dated Aug. 29, 2013, 12 pages.
Foreign Communication From a Counterpart Application, European Application No. 13825847.0, Extended European Search Report dated Jun. 17, 2015, 7 pages.

* cited by examiner

TRANSMITTING CIRCUIT, TRANSCEIVER, COMMUNICATION SYSTEM, AND METHOD FOR TRANSMITTING DATA

CROSS-REFERENCE TO RELATED APPLICATION

This application is a continuation of International Application No. PCT/CN2013/076135, filed on May 23, 2013, which claims priority to Chinese Patent Application No. 201210265353.5, filed on Jul. 30, 2012, both of which are hereby incorporated by reference in their entireties.

TECHNICAL FIELD

The present invention relates to the field of communications, and in particular, to a transmitting circuit, a transceiver, a communication system, and a method for transmitting data.

BACKGROUND

A radio communication system has an increasingly higher requirement on bandwidth. An E-Band microwave technology has won popularity from a medium-and-long distance high-speed wireless point-to-point system because it has a bandwidth of 10 gigahertz (GHz) (71-76 GHz and 81-86 GHz) and is in an atmospheric fading decline. With the upgrading of the technology and processing capabilities of chip, technologies such as a high-performance signal processing technology, and a high-spectral-efficiency modulation and coding technology all have come true, which all require the system to have a highly efficient analog to digital converter (ADC) and digital to analog converter (DAC).

Generally, an ADC/DAC bottleneck caused by a high bandwidth and high speed may be solved using a time domain interleaved sampling method or a frequency domain multichannel sampling method. However, these two methods need complex post-processing on an output signal of the ADC/DAC, which degrades system performance.

In addition, the DAC tends to have a higher speed and a higher precision than the ADC. Therefore, a case where capabilities of the DAC and ADC are asymmetric generally occurs in a communication system. For example, an E-band with the bandwidth of 5 GHz imposes a minimum requirement of as a high as 10 gigasample-per-second (Gsps) on the ADC and the DAC, but the DAC is easier to meet such a high requirement because the processing speed of the DAC is higher than that of the ADC.

SUMMARY

Embodiments of the present invention provide a transmitting circuit, a transceiver, a communication system, and a method for transmitting data, which can reduce the processing complexity of the transceiver, thereby improving system performance.

In one aspect, a transmitting circuit is provided, including a digital interface circuit configured to obtain, in a predetermined bandwidth, first data to be sent, and decompose the first data into N parallel first sub digital signal flows, where a bandwidth occupied by each first sub digital signal flow of the N first sub digital signal flows is smaller than the predetermined bandwidth and N is a positive integer; a digital modulation circuit configured to receive the N first sub digital signal flows, and modulate the N first sub digital signal flows to obtain N first modulated signals; a first frequency relocation circuit configured to receive the N first modulated signals, and perform frequency relocation on the N first modulated signals, where there is no frequency band gap between adjacent first modulated signals of the N first modulated signals that have undergone frequency relocation; a first synthesizer configured to synthesize M first modulated signals of the N first modulated signals that have undergone frequency relocation into a first bandwidth signal, where M is a positive integer; a first digital to analog converter configured to receive the first bandwidth signal, and perform digital to analog conversion on the first bandwidth signal to obtain a first analog signal; and a first up-conversion circuit configured to receive the first analog signal, and convert the first analog signal into a radio frequency signal, so that the radio frequency signal is sent by an antenna.

In another aspect, a transceiver is provided, including a receiving circuit and the foregoing transmitting circuit, where the receiving circuit includes a down-conversion circuit configured to convert a radio frequency signal received on a receiving antenna into an analog signal; an intermediate frequency power divider configured to decompose the analog signal into Q parallel sub analog signal flows; a second frequency relocation circuit configured to perform frequency relocation on the Q parallel sub analog signal flows; Q analog to digital converters configured to perform analog to digital conversion on the Q parallel sub analog signal flows respectively to obtain Q parallel digital signal flows; a digital demodulation circuit configured to perform demodulation processing on the Q parallel digital signal flows to obtain Q parallel demodulated signals; and a digital interface circuit configured to synthesize the Q parallel demodulated signals into second data.

In another aspect, a communication system is provided, where the communication system includes a transmitter and a receiver, where the transmitter includes the foregoing transmitting circuit; and the receiver includes a down-conversion circuit configured to convert a radio frequency signal received on a receiving antenna into an analog signal; an intermediate frequency power divider configured to decompose the analog signal into N parallel sub analog signal flows; a second frequency relocation circuit configured to perform frequency relocation on the N parallel sub analog signal flows; N analog to digital converters configured to perform analog to digital conversion on the N parallel sub analog signal flows respectively to obtain N parallel digital signal flows; a digital demodulation circuit configured to perform demodulation processing on the N parallel digital signal flows to obtain N parallel demodulated signals; and a digital interface circuit configured to synthesize the N parallel demodulated signals into first data.

In another aspect, a method for transmitting data is provided, including obtaining, in a predetermined bandwidth, first data to be sent, and decomposing the first data into N parallel first sub digital signal flows, where a bandwidth occupied by each first sub digital signal flow of the N first sub digital signal flows is smaller than the predetermined bandwidth and N is a positive integer; modulating the N first sub digital signal flows to obtain N first modulated signals; performing frequency relocation on the N first modulated signals, where there is no frequency band gap between adjacent first modulated signals of the N first modulated signals that have undergone frequency relocation; synthesizing M first modulated signals of the N first modulated signals that have undergone frequency relocation into a first bandwidth signal, where M is a positive integer; performing digital to analog conversion on the first bandwidth signal to obtain a first analog signal; and converting the first analog signal into a radio frequency signal, so that the radio frequency signal is sent by an antenna.

In another aspect, a method for transmitting data is provided, including a method for receiving data and the foregoing method for transmitting data, where the method for receiving data includes converting a radio frequency signal received on a receiving antenna into an analog signal; decomposing the analog signal into Q parallel sub analog signal flows; performing frequency relocation on the Q parallel sub analog signal flows; performing analog to digital conversion on the Q parallel sub analog signal flows respectively to obtain Q parallel digital signal flows; performing demodulation processing on the Q parallel digital signal flows to obtain Q parallel demodulated signals; and synthesizing the Q parallel demodulated signals into second data.

In another aspect, a communication method is provided, including a method for receiving data and the foregoing method for transmitting data, where the method for receiving data includes converting a radio frequency signal received on a receiving antenna into an analog signal; decomposing the analog signal into N parallel sub analog signal flows; performing frequency relocation on the N parallel sub analog signal flows; performing analog to digital conversion on the N parallel sub analog signal flows respectively to obtain N parallel digital signal flows; performing demodulation processing on the N parallel digital signal flows to obtain N parallel demodulated signals; and synthesizing the N parallel demodulated signals into first data.

The transmitting circuit in the technical solution can decompose data into multiple parallel sub digital signal flows, perform modulation and frequency relocation on the multiple sub digital signal flows respectively, and then synthesize the multiple sub digital signal flows into a large bandwidth signal; further, the transmitting circuit converts the large bandwidth signal into an analog signal using a digital to analog converter, and finally converts the analog signal into a radio frequency signal through up-conversion. Because the embodiments of the present invention can divide a large bandwidth into multiple subbands and can process multiple sub digital signal flows at a transmitting end and a receiving end independently, no complex post-processing needs to be performed on the analog signal after the digital to analog conversion is performed, which can reduce the processing complexity, thereby improving system performance.

BRIEF DESCRIPTION OF DRAWINGS

To illustrate the technical solutions in the embodiments of the present invention more clearly, the following briefly introduces the accompanying drawings required for describing the embodiments of the present invention. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

It should be understood that the technical solution of the present invention may be applied to various communication systems, for example, a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a Long Term Evolution-Advanced (LTE-A) system, a Universal Mobile Telecommunication System (UMTS), and the like.

The embodiments of the present invention may be applied to wireless networks of different standards. A radio access network may include different network elements in different systems. For example, network elements of the radio access network on LTE and LTE-A include an evolved base station (eNB, eNodeB), network elements of the radio access network on WCDMA include a radio network controller (RNC) and a base station (NodeB). Similarly, other wireless networks such as Worldwide Interoperability for Microwave Access (WiMAX) may also use a solution similar to that provided in the embodiments of the present invention, with only a slight difference in related modules of the base station system, which is not limited in the embodiments of the present invention.

The embodiments of the present invention provide an implementation solution of a high-speed millimetric wave (an E-Band in particular) system, which may be applied to a backhaul technology of microwave communication. The application scope of this implementation solution is not limited thereto according to the embodiments of the present invention, and the implementation solution may also be applied to other microwave or radio communication systems, for example, a wireless point-to-point system and the like.

When a time domain interleaved sampling method or a frequency domain multichannel sampling method is used to solve an ADC/DAC bottleneck caused by a high bandwidth and high speed, complex post-processing needs to be performed on an output signal of the ADC/DAC, and a transmitted signal is easily distorted, making it difficult to ensure system performance. The foregoing two methods have a very high requirement for DAC/ADC synchronization, which makes it more difficult to perform joint control on multiple DACs/ADCs.

Figure 1:
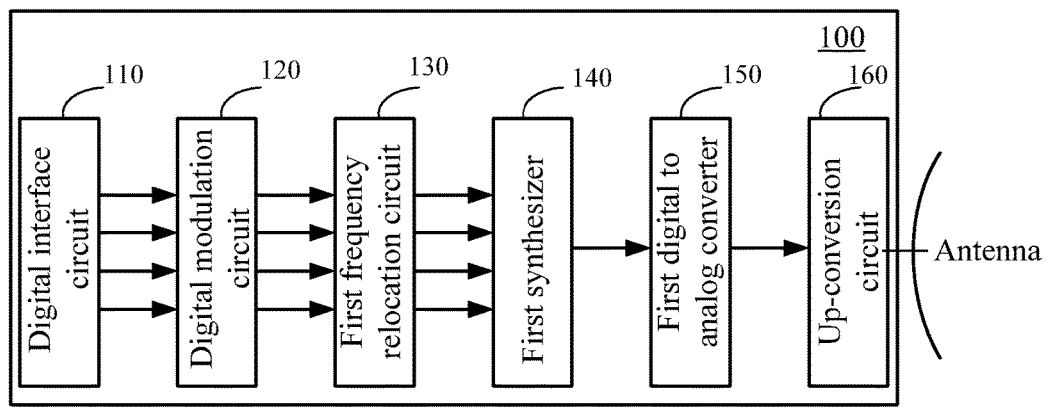
FIG. 1 is a schematic circuit diagram of a transmitting circuit according to a first embodiment of the present invention.

FIG. 1 is a schematic circuit diagram of a transmitting circuit 100 according to a first embodiment of the present invention. The transmitting circuit 100 includes a digital interface circuit 110, a digital modulation circuit 120, a first frequency relocation circuit 130, a first synthesizer 140, a first digital to analog converter 150, and an up-conversion circuit 160.

The digital interface circuit 110 obtains, in a predetermined bandwidth, first data to be sent, and decomposes the first data into N parallel first sub digital signal flows, where a bandwidth occupied by each first sub digital signal flow of the N first sub digital signal flows is smaller than the predetermined bandwidth and N is a positive integer. The digital modulation circuit 120 receives the N first sub digital signal flows, and modulates the N first sub digital signal flows to obtain N first modulated signals. The first frequency relocation circuit 130 receives the N first modulated signals, and performs frequency relocation on the N first modulated signals, where there is no frequency band gap between adjacent first modulated signals of the N first modulated signals that have undergone frequency relocation. The first synthesizer 140 is configured to synthesize M first modulated signals of the N first modulated signals that have undergone frequency relocation into a first bandwidth signal, where M is a positive integer. The first digital to analog converter 150 is configured to receive the first bandwidth signal, and perform digital to analog conversion on the first bandwidth signal to obtain a first analog signal. The first up-conversion circuit 160 receives the first analog signal, and converts the first analog signal into a radio frequency signal, so that the radio frequency signal is sent by an antenna.

According to the embodiment of the present invention, a predetermined bandwidth can be divided into N subbands, and each subband is processed independently, that is, each subband is sent and received independently. That is, N sub digital signal flows can be processed independently in a transmission channel of the transmitting circuit, and at least some sub digital signal flows of the N sub digital signal flows whose frequency bands are continuous are synthesized into one data flow. In addition, digital to analog conversion is performed on the data flow to obtain an analog signal; after the analog signal obtained by conversion is processed using an analog circuit, the analog signal is sent through a transmitting antenna.

At a transmitting end, the digital interface unit decomposes a single data flow or multiple data flows into multiple parallel data flows (that is, multiple sub digital signal flows). For example, the digital interface unit may decompose one piece of 4-bit data of a user into four 1-bit sub digital signal flows, or decompose two pieces of 2-bit data of a user into four 1-bit sub digital signal flows. Then, a digital modulator performs digital modulation on the N sub digital signal flows to obtain N first modulated signals with the same frequency. For example, the digital modulation circuit may perform modulation on the N sub digital signal flows respectively using N Field Programmable Gate Arrays (FPGAs). The first frequency relocation circuit may perform frequency relocation on the N first modulated signals respectively using N frequencies to obtain N modulated signals with continuous frequencies without a frequency band gap. For example, the first frequency relocation circuit may perform frequency relocation on the N first modulated signals using N frequency mixers and corresponding N local oscillators. The first synthesizer synthesizes at least some modulated signals of the N modulated signals into a large bandwidth signal. A high-speed DAC performs digital to analog conversion on the large bandwidth signal, and sends the converted signal through the up-conversion circuit. Because each subband is processed independently at the transmitting end, each subband can be split at the receiving end using a band-pass filter, and subbands are sampled by a low-speed ADC to obtain the sub digital signal flows; finally, digital modulation is performed on the sub digital signal of each subband independently.

It should be understood that bandwidths occupied by the first sub digital signal flows may be equal or unequal and M may be smaller than or equal to N. For example, when M is smaller than N, some sub digital signal flows are synthesized into a large bandwidth signal; when M is equal to N, all the sub digital signal flows are synthesized into a large bandwidth signal.

The transmitting circuit according to the embodiment of the present invention can decompose data into multiple parallel sub digital signal flows, perform modulation and frequency relocation on the multiple sub digital signal flows respectively, and then synthesize the multiple sub digital signal flows into a large bandwidth signal; further, the transmitting circuit converts the large bandwidth signal into an analog signal using a digital to analog converter, and finally converts the analog signal into a radio frequency signal through up-conversion. Because the embodiment of the present invention can divide a large bandwidth into multiple subbands and can process multiple sub digital signal flows at a transmitting end and a receiving end independently, no complex post-processing needs to be performed on the analog signal after the digital to analog conversion is performed, which can reduce the signal processing complexity of a transceiver, thereby improving system performance.

Because there is no frequency band gap between the multiple modulated signals that have undergone frequency relocation, spectral utilization is increased.

In addition, at the transmitting end, multiple subchannels use only one high-speed DAC and one analog intermediate frequency circuit, thereby saving devices and costs of the transmitting circuit.

According to the embodiment of the present invention, the first synthesizer 140 may include an adder, where the adder is configured to add the N first modulated signals that have undergone frequency relocation, to synthesize the modulated signals into a first bandwidth signal.

According to the embodiment of the present invention, N may be at least 4. The value of N is not limited thereto according to the embodiment of the present invention, and N may also be smaller than 4. In addition, the first data may be at least one binary digital signal flow.

Figure 2:
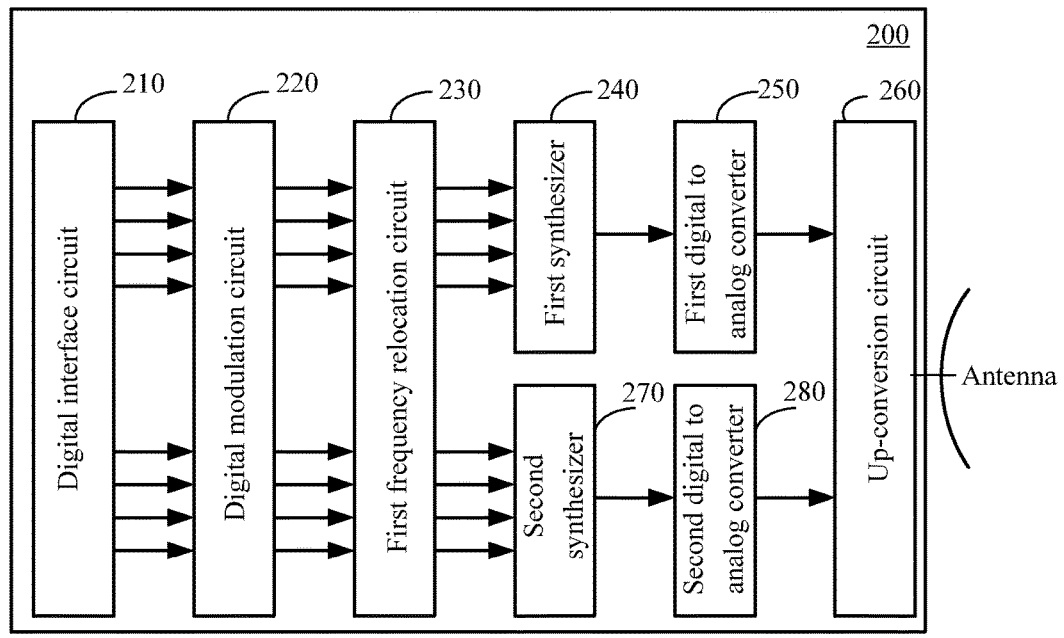
FIG. 2 is a schematic circuit diagram of a transmitting circuit according to a second embodiment of the present invention.

FIG. 2 is a schematic circuit diagram of a transmitting circuit 200 according to a second embodiment of the present invention. The transmitting circuit provided in the embodiment in FIG. 2 may use more than two synthesizers and digital to analog converters.

The transmitting circuit in FIG. 2 includes a digital interface circuit 210, a digital modulation circuit 220, a first frequency relocation circuit 230, a first synthesizer 240, a first digital to analog converter 250, and an up-conversion circuit 260, which are similar to the digital interface circuit 110, the digital modulation circuit 120, the first frequency relocation circuit 130, the first synthesizer 140, the first digital to analog converter 150, and the up-conversion circuit 160 in FIG. 1 and are not further described herein.

The transmitting circuit 200 in FIG. 2 further includes a second synthesizer 270 and a second digital to analog converter 280.

The second synthesizer 270 synthesizes L first modulated signals of the N first modulated signals that have undergone frequency relocation into a second bandwidth signal, where the L first modulated signals are different from the M first modulated signals, that is, the L first modulated signals are signals other than the M first modulated signals of the N first modulated signals and L is a positive integer. The second digital to analog converter 280 receives the second bandwidth signal, and performs digital to analog conversion on the second bandwidth signal to obtain a second analog signal; the up-conversion circuit 260 is configured to receive the first analog signal and the second analog signal, and synthesize the first analog signal and the second analog signal into a radio frequency signal.

For example, the first frequency relocation circuit may perform frequency relocation on the N first modulated signals respectively using N frequencies with the same gap, so that bandwidths of the N first modulated signals that have undergone frequency relocation are continuous, that is, bandwidths of the N first modulated signals are adjacent. The first frequency relocation circuit may also perform frequency relocation on the L first modulated signals respectively using L frequencies with the same gap, while perform frequency relocation on the M first modulated signals respectively using M frequencies with the same gap. In this case, the first analog signal and the second analog signal may have bandwidth overlapping or a frequency gap.

Optionally, as another embodiment, the up-conversion circuit 260 may also perform frequency relocation on the first analog signal and the second analog signal respectively before synthesizing the first analog signal and the second analog signal into the radio frequency signal.

For example, in a case where the first analog signal and the second analog signal have bandwidth overlapping or a frequency band gap, frequency relocation may be further performed on the first analog signal and the second analog signal, so that the bandwidths of the first analog signal and the second analog signals that have undergone frequency relocation are continuous and do not have a frequency gap or overlapping.

Figure 3:
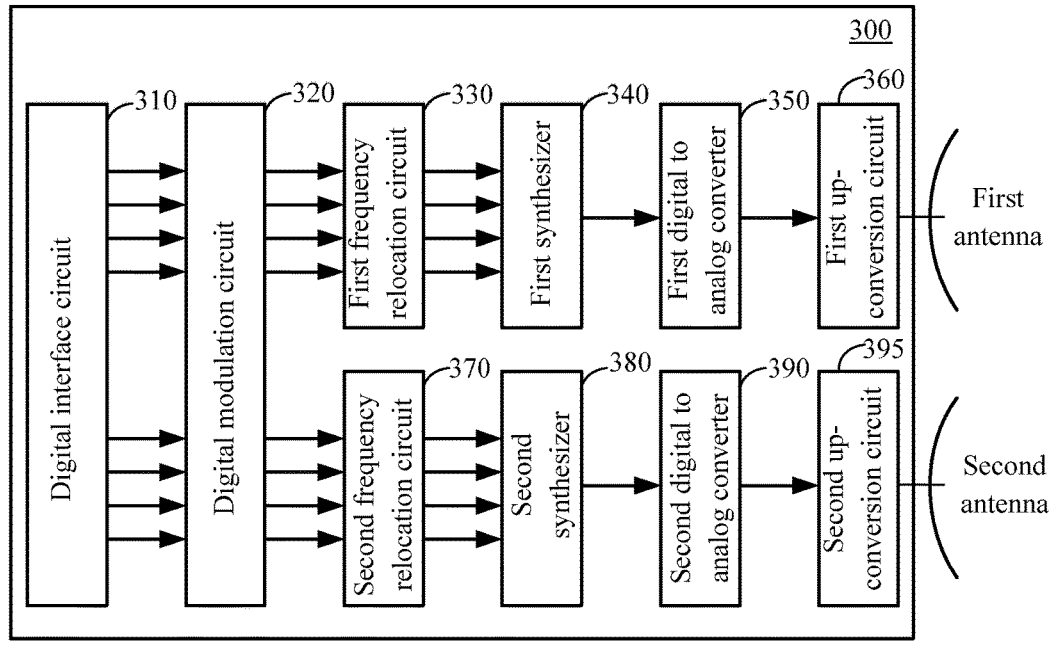
FIG. 3 is a schematic circuit diagram of a transmitting circuit according to a third embodiment of the present invention.

FIG. 3 is a schematic circuit diagram of a transmitting circuit 300 according to a third embodiment of the present invention. The transmitting circuit provided in the embodiment in FIG. 3 includes a transmitting circuit corresponding to each antenna of multiple antennas (for example, a first antenna and a second antenna), so that a multi-antenna system can be supported. Each unit of a transmitting circuit corresponding to the first antenna has the same function as each unit of a transmitting circuit corresponding to the second antenna.

Corresponding to the first antenna, the transmitting circuit 300 in FIG. 3 includes a digital interface circuit 310, a digital modulation circuit 320, a first frequency relocation circuit 330, a first synthesizer 340, a first digital to analog converter 350, and a first up-conversion circuit 360, which are similar to the digital interface circuit 110, the digital modulation circuit 120, the first frequency relocation circuit 130, the first synthesizer 140, the first digital to analog converter 150, and the up-conversion circuit 160 in FIG. 1 and are not further described herein.

According to the embodiment of the present invention, corresponding to the second antenna, the digital interface circuit 310 further obtains, in the predetermined bandwidth, second data to be sent, and decomposes the second data into N parallel second sub digital signal flows, where a bandwidth occupied by each second sub digital signal flow of the N second sub digital signal flows is smaller than the predetermined bandwidth. As an embodiment, M may be equal to N; the digital modulation circuit 320 further receives the N second sub digital signal flows, and modulates the N second sub digital signal flows to obtain N second modulated signals.

Corresponding to the second antenna, the transmitting circuit 300 in FIG. 3 further includes a second frequency relocation circuit 370, a second synthesizer 380, a second digital to analog converter 390, and a second up-conversion circuit 395.

The second frequency relocation circuit 370 receives the N second modulated signals, and performs frequency relocation on the N second modulated signals, where there is no frequency band gap between adjacent second modulated signals of the N second modulated signals that have undergone frequency relocation. The second synthesizer 380 synthesizes the N second modulated signals that have undergone frequency relocation into a second bandwidth signal. The second digital to analog converter 390 receives the second bandwidth signal, and performs digital to analog conversion on the second bandwidth signal to obtain a second analog signal. The first up-conversion circuit 360 receives a first analog signal, and converts the first analog signal into a first radio frequency signal, so that the first radio frequency signal is sent by the first antenna. The second up-conversion circuit 395 receives the second analog signal, and converts the second analog signal into a second radio frequency signal, so that the second radio frequency signal is sent by the second antenna.

According to the embodiment of the present invention, the digital modulation circuit 320 includes N modulators, where the N modulators modulate the N first sub digital signal flows respectively and modulate the N second sub digital signal flows respectively.

For example, the modulators may be implemented using an FGPA, and digital modulation is performed, using the same FPGA, on the first sub digital signal flows corresponding to the first antenna and the second sub digital signal flows corresponding to the second antenna. That is, a first modulated signal and a second modulated signal output from the same FPGA can be output to a frequency mixer that performs frequency relocation using the same frequency.

Due to independence of each frequency domain subchannel, highly complex digital processing devices and FPGAs may be distributed in multiple different DSP/FPGA chips/boards, thereby making the implementation easier and more flexible.

When M=N, sub digital signal flows of the first data corresponding to the first antenna or sub digital signal flows of the second data corresponding to the second antenna are synthesized into a large bandwidth signal, and digital to analog conversion is performed on the large bandwidth signal using a DAC. That is, at the transmitting end, all subchannels corresponding to each antenna use only one high speed DAC and one analog intermediate frequency circuit, thereby saving devices and costs of the transmitting circuit.

Figure 4:
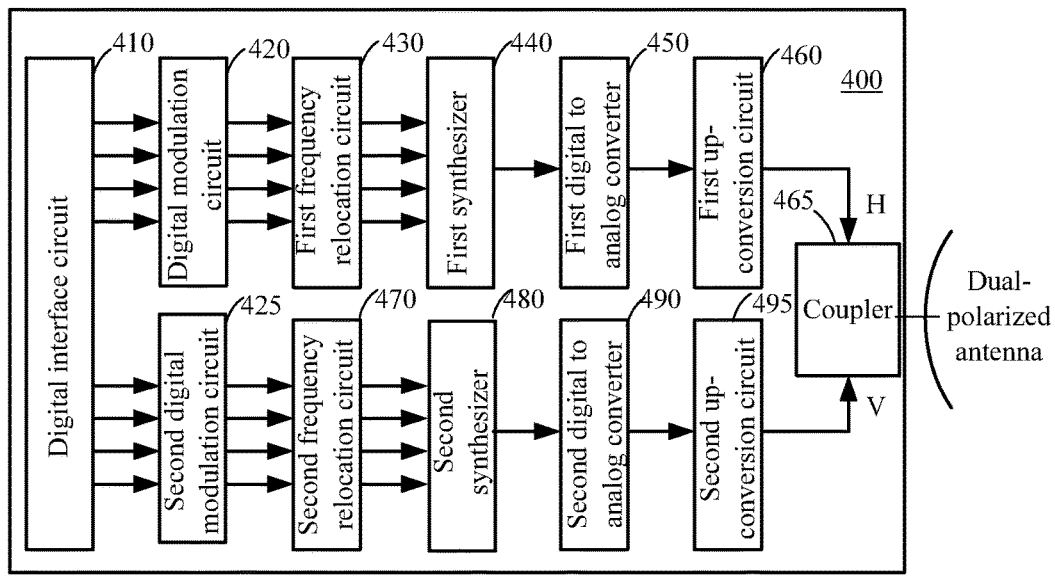
FIG. 4 is a schematic circuit diagram of a transmitting circuit according to a fourth embodiment of the present invention.

FIG. 4 is a schematic circuit diagram of a transmitting circuit 400 according to a fourth embodiment of the present invention. The transmitting circuit provided in the embodiment in FIG. 4 includes transmitting circuits corresponding to multi-polarized antennas (for example, an H-polarized antenna and a V-polarized antenna), so that a multi-polarized antenna system can be supported.

The transmitting circuit 400 in FIG. 4 includes a digital interface circuit 410, a digital modulation circuit 420, a first frequency relocation circuit 430, a first synthesizer 440, a first digital to analog converter 450, and a first up-conversion circuit 460, which are similar to the digital interface circuit 110, the digital modulation circuit 120, the first frequency relocation circuit 130, the first synthesizer 140, the first digital to analog converter 150, and the up-conversion circuit 160 in FIG. 1 and are not further described herein.

A transmitting antenna of the transmitting circuit 400 is a dual-polarized antenna; the digital modulation circuit 420 modulates the N first sub digital signal flows on the H-polarized antenna, and preferably M=N.

The digital interface circuit 410 further obtains, in the predetermined bandwidth, second data to be sent, and decomposes the second data into K parallel second sub digital signal flows, where a bandwidth occupied by each second sub digital signal flow of the K second sub digital signal flows is smaller than the predetermined bandwidth and K is a positive integer.

The digital modulation circuit 420 further receives the K second sub digital signal flows, and modulates the K second sub digital signal flows on a V-polarized antenna to obtain K second modulated signals.

The transmitting circuit 400 further includes a second digital modulation circuit 425, a second frequency relocation circuit 470, a second synthesizer 480, a second digital to analog converter 490, a second up-conversion circuit 495, and a coupler 465.

The second digital modulation circuit 425 receives the K second sub digital signal flows, and modulates the K second sub digital signal flows on the V-polarized antenna to obtain K second modulated signals; the second frequency relocation circuit 470 receives the K second modulated signals, and performs frequency relocation on the K second modulated signals, where there is no frequency band gap between adjacent second modulated signals of the K second modulated signals that have undergone frequency relocation; the second synthesizer synthesizes the K second modulated signals that have undergone frequency relocation into a second bandwidth signal; the second digital to analog converter 490 receives the second bandwidth signal, and performs digital to analog conversion on the second bandwidth signal to obtain a second analog signal, where the first up-conversion circuit 460 receives the first analog signal, and converts the first analog signal into a first radio frequency signal. The second up-conversion circuit 495 receives the second analog signal, and converts the second analog signal into a second radio frequency signal. The coupler 465 couples the first radio frequency signal and the second radio frequency signal, so that the first radio frequency signal and the second radio frequency signal are sent by the dual-polarized antenna respectively.

According to the embodiment of the present invention, the digital modulation circuit 420 includes N+K modulators, where the N modulators modulate the N first sub digital signal flows respectively and the K modulators modulate the K second sub digital signal flows respectively and N may be equal to K.

Figure 5:
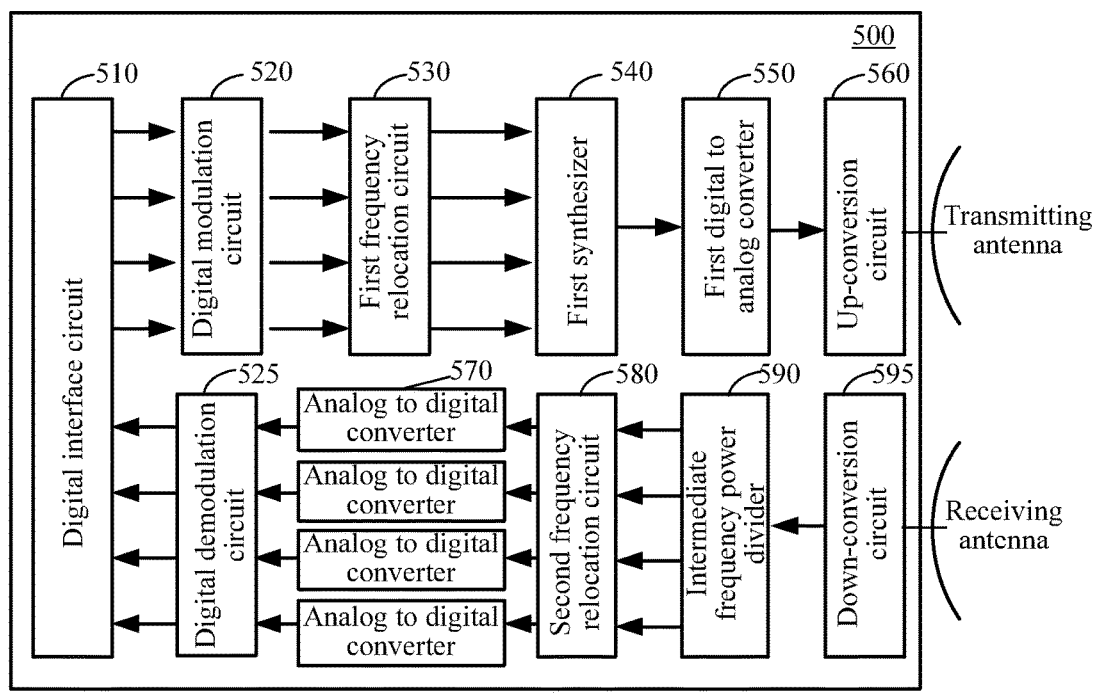
FIG. 5 is a schematic circuit diagram of a transceiver according to a fifth embodiment of the present invention.

FIG. 5 is a schematic circuit diagram of a transceiver 500 according to a fifth embodiment of the present invention. The transceiver 500 includes a receiving circuit and a transmitting circuit. The transmitting circuit in FIG. 5 may include a digital interface circuit 510, a digital modulation circuit 520, a first frequency relocation circuit 530, a first synthesizer 540, a first digital to analog converter 550, and an up-conversion circuit 560, which are similar to the digital interface circuit 110, the digital modulation circuit 120, the first frequency relocation circuit 130, the first synthesizer 140, the first digital to analog converter 150, and the up-conversion circuit 160 in FIG. 1 and are not further described herein.

The receiving circuit may include a down-conversion circuit 595, an intermediate frequency power divider 590, a second frequency relocation circuit 580, and N analog to digital converters 570.

The down-conversion circuit 595 converts a radio frequency signal received on a receiving antenna into an analog signal. The intermediate frequency power divider 590 decomposes the analog signal into N parallel sub analog signal flows. The second frequency relocation circuit 580 performs frequency relocation on the N parallel sub analog signal flows. The N analog to digital converters 570 perform analog to digital conversion on the N parallel sub analog signal flows respectively to obtain N parallel digital signal flows. The digital demodulation circuit 525 performs demodulation processing on the N parallel digital signal flows to obtain N parallel demodulated signals. The digital interface circuit 510 synthesizes the N parallel demodulated signals into second data.

According to the embodiment of the present invention, data can be decomposed into multiple parallel sub digital signal flows; modulation and frequency relocation are performed on the multiple sub digital signal flows respectively, and then the multiple sub digital signal flows are synthesized into a large bandwidth signal; further, the large bandwidth signal is converted into an analog signal using a digital to analog converter, and finally the analog signal is converted into a radio frequency signal through up-conversion. Because the embodiment of the present invention can divide a large bandwidth into multiple subbands and can process multiple sub digital signal flows at a transmitting end and a receiving end independently, no complex post-processing needs to be performed on the analog signal after the digital to analog conversion is performed, which can reduce the signal processing complexity of a transceiver, thereby improving system performance.

According to the embodiment of the present invention, a requirement for an ADC may be reduced in a frequency domain subchannel sampling manner at a receiving end; and subchannels in a digital domain are divided at a transmitting end, so that the receiving end can process each independent frequency domain subchannel. On one hand, each frequency domain subchannel can transmit data independently, thereby increasing a system flexibility. On the other hand, due to independence of each frequency domain subchannel, highly complex digital processing devices and FPGAs may be distributed in multiple different DSP/FPGA chips/boards. Meanwhile, only one high speed DAC and one analog transmission intermediate frequency circuit are used, thereby saving related devices and costs.

Figure 6:
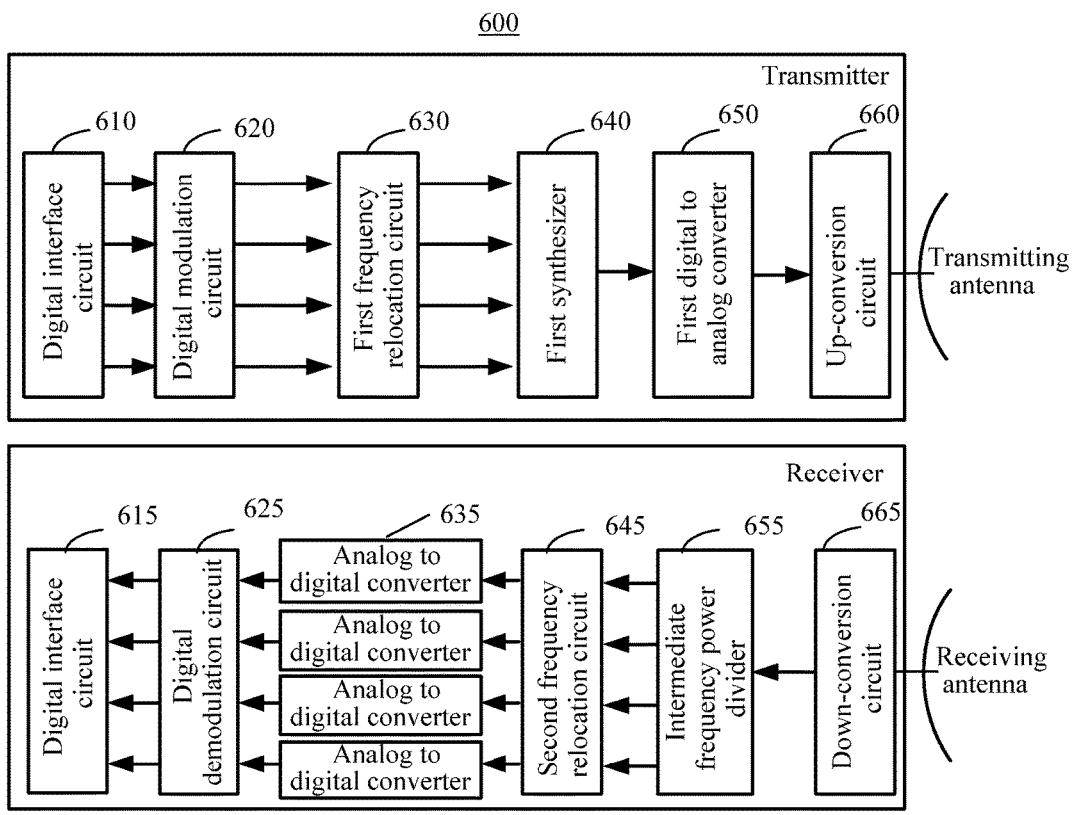
FIG. 6 is a schematic circuit diagram of a communication system according to a sixth embodiment of the present invention.

FIG. 6 is a schematic circuit diagram of a communication system 600 according to a sixth embodiment of the present invention. The communication system 600 includes a transmitter and a receiver.

The transmitter in FIG. 6 includes the transmitting circuit in FIG. 1, FIG. 2, FIG. 3, or FIG. 4. The transmitting circuit includes a digital interface circuit 610, a digital modulation circuit 620, a first frequency relocation circuit 630, a first synthesizer 640, a first digital to analog converter 650, and an up-conversion circuit 660, which are similar to the digital interface circuit 110, the digital modulation circuit 120, the first frequency relocation circuit 130, the first synthesizer 140, the first digital to analog converter 150, and the up-conversion circuit 160 in FIG. 1 and are not further described herein.

The receiver includes a down-conversion circuit 665, an intermediate frequency power divider 655, a second frequency relocation circuit 645, Q analog to digital converters 635, a digital demodulation circuit 625, and a digital interface circuit 615.

The down-conversion circuit 665 converts a radio frequency signal received on a receiving antenna into an analog signal. The intermediate frequency power divider 655 decomposes the analog signal into Q parallel sub analog signal flows. The second frequency relocation circuit 645 performs frequency relocation on the Q parallel sub analog signal flows. The Q analog to digital converters 635 perform analog to digital conversion on the Q parallel sub analog signal flows respectively to obtain Q parallel digital signal flows. The digital demodulation circuit 625 performs demodulation processing on the Q parallel digital signal flows to obtain Q parallel demodulated signals. The digital interface circuit 615 synthesizes the Q parallel demodulated signals into first data, where Q may be equal to N in applications.

According to the embodiment of the present invention, data can be decomposed into multiple parallel sub digital signal flows; modulation and frequency relocation are performed on the multiple sub digital signal flows respectively, and then the multiple sub digital signal flows are synthesized into a large bandwidth signal; further, the large bandwidth signal is converted into an analog signal using a digital to analog converter, and finally the analog signal is converted into a radio frequency signal through up-conversion. Because the embodiment of the present invention can divide a large bandwidth into multiple subbands and can process multiple sub digital signal flows at a transmitting end and a receiving end independently, no complex post-processing needs to be performed on the analog signal after the digital to analog conversion is performed, which can reduce the signal processing complexity of a transceiver, thereby improving system performance.

According to the embodiment of the present invention, a requirement for an ADC may be reduced in a frequency domain subchannel sampling manner at a receiving end; and subchannels in a digital domain are divided at a transmitting end, so that the receiving end can process each independent frequency domain subchannel. On one hand, each frequency domain subchannel can transmit data independently, thereby increasing a system flexibility. On the other hand, due to independence of each frequency domain subchannel, highly complex digital processing devices and FPGAs may be distributed in multiple different DSP/FPGA chips/boards. Meanwhile, only one high speed DAC and one analog transmission intermediate frequency circuit are used, thereby saving related devices and costs.

Figure 10:
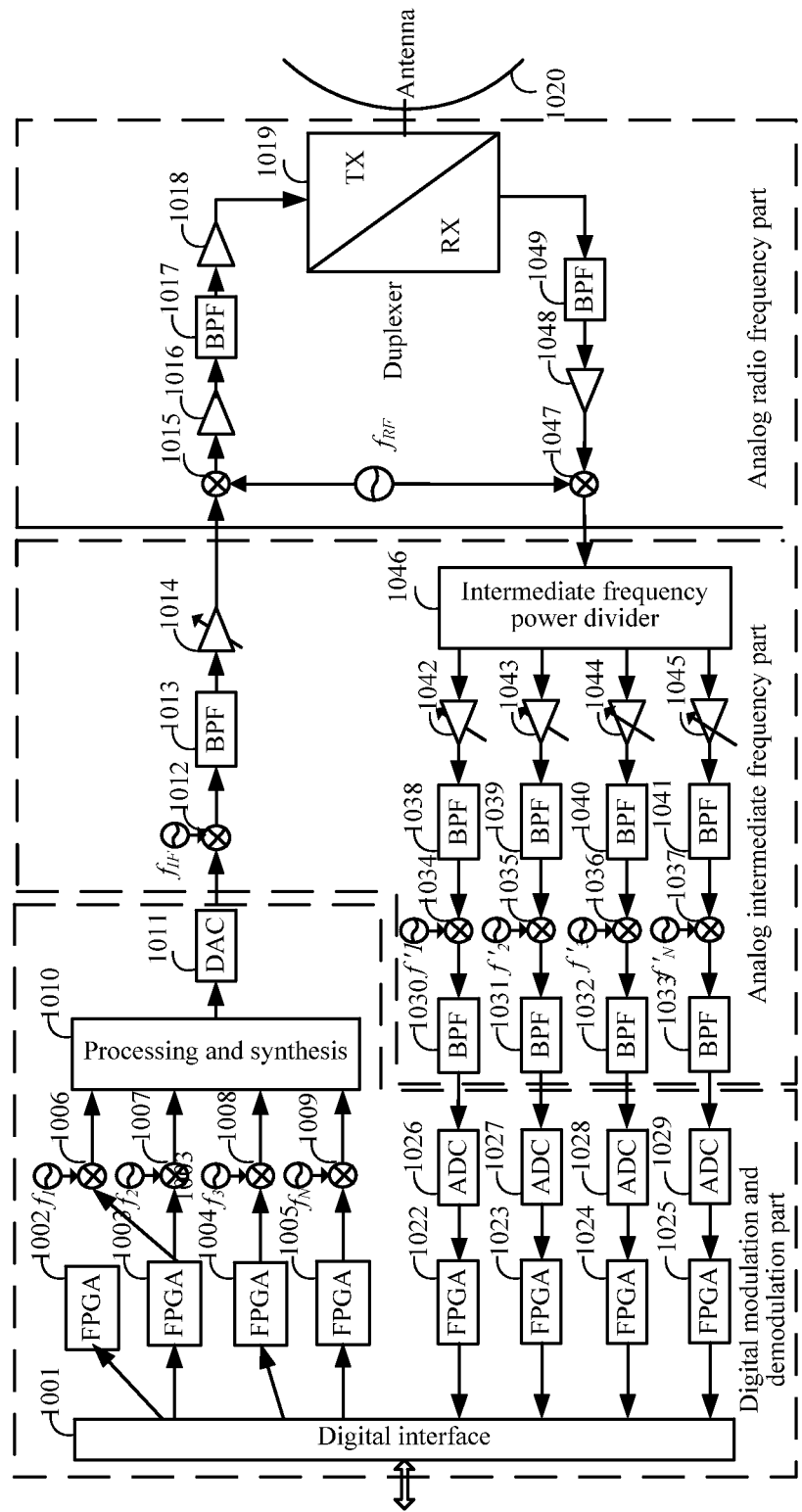
FIG. 10 is a schematic circuit diagram of a transceiver according to a tenth embodiment of the present invention.
Figure 12:
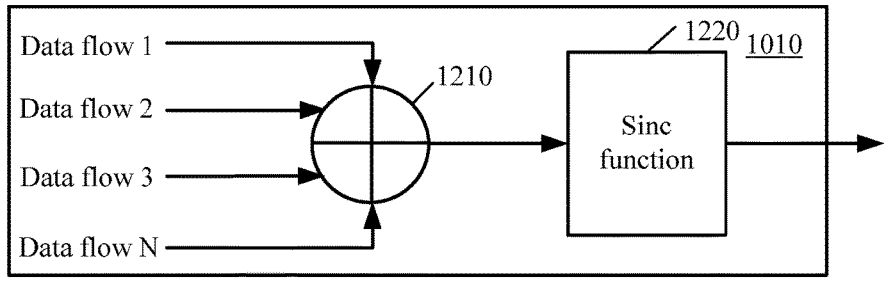
FIG. 12 is a schematic circuit diagram of a synthesizer according to an embodiment of the present invention.

The embodiments of the present invention are described in more detail with reference to specific examples. FIG. 10 is a schematic circuit diagram of a transceiver according to a tenth embodiment of the present invention. FIG. 12 is a schematic circuit diagram of a synthesizer according to an embodiment of the present invention. The transceiver in FIG. 10 is an example of the transceiver in FIG. 5.

Referring to FIG. 10, a transmitting circuit of the transceiver includes one DAC, while a receiving circuit of the transceiver includes N ADCs, that is, the number of ADCs is N times the number of DACs. The transceiver may be divided into three parts: a digital modulation and demodulation part, an analog intermediate frequency part, and an analog radio frequency part. The following describes a working principle of the transceiver in detail using the analog intermediate frequency part and the analog radio frequency part as an example.

Referring to FIG. 10, at a transmitting end, a digital interface circuit 1001 obtains data in a predetermined bandwidth (for example, 5 GHz), and decomposes the data into N parallel sub digital signal flows, where a bandwidth occupied by each sub digital signal flow is smaller than the predetermined bandwidth. For example, if data with a total bandwidth of 5 GHz is decomposed into four digital signal flows (that is, four subchannels), the bandwidth of each sub digital signal flow is 1.25 GHz. For example, a piece of 4-bit data may be divided into four pieces of 1-bit sub digital signal flows, or two pieces of 2-bit data may be divided into four pieces of 1-bit sub digital signal flows, where the four pieces of 1-bit sub digital signal flows are transmitted in four subchannels respectively.

A digital modulation circuit formed by N (for example, four) FPGAs 1002 to 1005 receives the N sub digital signal flows, and modulates the N sub digital signal flows to obtain N modulated signals, where the N FPGAs 1002 to 1005 correspond to the N sub digital signal flows one by one. According to the embodiment of the present invention, the digital modulation circuit may also be implemented using an application specific integrated circuit (ASIC) and the like.

The working principle of the digital modulation circuit is as follows: N sub digital signal flows are processed independently using the N FPGAs 1002 to 1005. Each FPGA has the same function, and the FPGA processing (in a single carrier or multicarrier modulation manner) on the sub channels mainly implement modulation on digital signals. The modulation on the digital signal flows includes but is not limited to channel coding, symbol mapping modulation, orthogonal frequency-division multiplexing (OFDM) modulation, pulse shaping, sampling rate conversion, pre-emphasis, pre-equalization, peak-to-average ratio suppression, and the like. Each FPGA may include an encoding module configured to encode input digital signal flows, for example configured to perform low-density parity-check (LDPC) coding; a constellation point mapping module configured to map the input sub digital signal flows to corresponding constellation points, for example, 64 phase quadrature amplitude modulation (QAM); an inverse fast Fourier transform (IFFT) module configured to perform inverse fast Fourier transform on the input sub digital signal flows to convert frequency domain signals into time domain signals; a window adding module configured to add a time domain window and a frequency domain window to the input time domain signals simultaneously or separately; a framing module configured to insert a preamble sequence into signals to implement a framing function; and a sampling rate converting module configured to convert a sampling rate into a sampling rate of the DAC. Through digital modulation by the FPGAs, the center frequency of a modulated signal output by each FPGA is 1.2 GHz, and a bandwidth occupied by useful signals is 0.5750 GHz to 1.8250 GHz.

A frequency relocation circuit formed by N frequency mixers 1006 to 1009 and N local oscillators $f_1$ to $f_N$ receives the N modulated signals, and performs frequency mixing and frequency relocation on the N modulated signals. For example, assuming that N=4, if the center frequency of the modulated signal output by each FPGA is 1.2 GHz and the local oscillators choose frequencies $f_1$=0 GHz, $f_2$=1.25 GHz, $f_3$=2.5 GHz, and $f_4$=3.75 GHz, after the frequency relocation is performed, the center frequencies of modulated signals output by the frequency mixers 1006 to 1009 are changed to 1.2 GHz, 1.45 GHz, 3.6 GHz, and 4.95 GHz respectively, with the total occupied frequency band of 0.5750 GHz to 5.5750 GHz, and there is no frequency band gap between adjacent modulated signals.

The synthesizer 1010 synthesizes the N second modulated signals that have undergone frequency relocation into a large bandwidth signal. Referring to FIG. 12, the synthesizer 1010 may include an adder 1210 and an SINC function 1220. The synthesizer 1010 adds data flow 1 to data flow N (the N modulated signals that have undergone frequency relocation). For example, assuming that N=4, and $f_1$=0 GHz, $f_2$=1.25 GHz, $f_3$=2.5 GHz, and $f_4$=3.75 GHz, the four subbands are synthesized into a large bandwidth signal of 5 GHz, that is, 0.5750 GHz to 5.5750 GHz. The SINC function 1220 is configured to compensate the synthesized large bandwidth signal, and output the compensated signal to a DAC 1011.

The DAC 1011 receives the large bandwidth signal from the synthesizer 1010, performs digital to analog conversion on the large bandwidth signal, and outputs the output analog signal to an up-conversion circuit.

The up-conversion circuit receives the analog signal output by the DAC 1011, and converts the analog signal into a radio frequency signal, so that the radio frequency signal is sent by an antenna. The up-conversion circuit may include an up-conversion of the intermediate frequency part and an up-conversion of the analog radio frequency part. In the analog intermediate frequency part, the analog signal output by the DAC 1011 undergoes an analog intermediate frequency modulation (that is, a first up-conversion) by a frequency mixer 1012 and a local oscillator $f_{IF}$, and then is filtered by a band pass filter (BPF) 1013, and is further amplified by an amplifier 1014; finally, the amplified analog signal is output to the analog radio frequency part. In the analog radio frequency part, the analog signal output by the analog intermediate frequency part undergoes an up-conversion (that is, a second up-conversion) by a frequency mixer 1015 and a local oscillator $f_{RF}$, and then is amplified by an amplifier 1016, and is further filtered by a BPF 1017; after the analog signal is amplified by an amplifier 1018, the amplified analog signal is transferred by a duplexer 1019 to an antenna 1020 for transmission.

At the receiving end, the antenna 1020 receives a radio frequency signal from a peer transmitter, where the radio frequency signal enters, through the duplexer 1019, a receiving circuit of the transceiver, and then is filtered by a BPF 1049; the radio frequency signal is further amplified by an amplifier 1048, and finally undergoes a down-conversion by a frequency mixer 1047 and the local oscillator $f_{RF}$ to obtain an analog intermediate frequency signal.

The analog intermediate frequency signal is divided by an intermediate frequency power divider 1046 to obtain N parallel sub analog signal flows with N same frequencies and transmitted in N subchannels respectively. The sub analog signal flows are respectively amplified by amplifiers 1042 to 1045, filtered by BPFs 1038 to 1041, then relocated, through frequency relocation (intermediate frequency down-conversion) by frequency mixers 1034 to 1037 and local oscillators $f_1'$ to $f_N'$, to a desired frequency, and finally, filtered by BPFs 1030 to 1033. Sub analog signals that have undergone intermediate frequency processing have the same frequency, which means that the frequency of each sub analog signal is the same as that of each signal output by the FPGAs of the transmitting end.

Multiple parallel sub data flows that have undergone intermediate frequency processing are sampled by their respective ADCs 1026-1029 to obtain sub digital signal flows (that is, discrete sampling signals) of the subchannels, and the sub digital signal flows are output to a digital demodulation circuit formed by N FPGAs 1022-1025 for demodulation.

The working principle of the digital demodulation circuit is as follows. Sub digital signal flows of the subchannels are processed by their respective FPGAs to obtain a sending bit decision signal corresponding to each sub digital signal flow. The FPGA processing of the subchannels mainly implement demodulation on digital signals, including a single carrier or multicarrier modulation manner. The demodulation on the digital signals includes but is not limited to channel estimation, coding demodulation, sampling rate conversion, synchronization, equalization, and the like. Each FPGA may include a sampling rate converting module configured to convert an ADC sampling rate into a sampling rate of a symbol rate; an automatic gain controlling module configured to estimate an input signal power, and adjust a gain of an analog device; a frame synchronizing module configured to implement a frame synchronization function; a frequency deviation estimating and compensating module configured to estimate and compensate a carrier frequency deviation and a sampling frequency deviation; an FFT module configured to convert a time domain signal into a frequency domain signal; a channel estimating module configured to perform channel estimation to implement correlation detection on signals; a residual frequency deviation estimating and compensating module configured to estimate and compensate a residual carrier frequency deviation and a sampling frequency deviation; a phase noise eliminating module configured to eliminate phase noise caused by radio frequency devices; and a decoding module configured to implement data decoding.

The sending bit decision signals of multiple subchannels that have been processed by the FPGA are synthesized by a digital interface circuit 1001 to obtain a high speed receiving decision signal.

According to the embodiment of the present invention, a requirement for an ADC may be reduced in a frequency domain subchannel sampling manner at a receiving end; and subchannels in a digital domain are divided at a transmitting end, so that the receiving end can process each independent frequency domain subchannel. On one hand, each frequency domain subchannel can transmit data independently, thereby increasing a system flexibility. On the other hand, due to independence of each frequency domain subchannel, highly complex digital processing devices and FPGAs may be distributed in multiple different DSP/FPGA chips/boards. Meanwhile, only one high speed DAC and one analog transmission intermediate frequency circuit are used, thereby saving related devices and costs.

Figure 11:
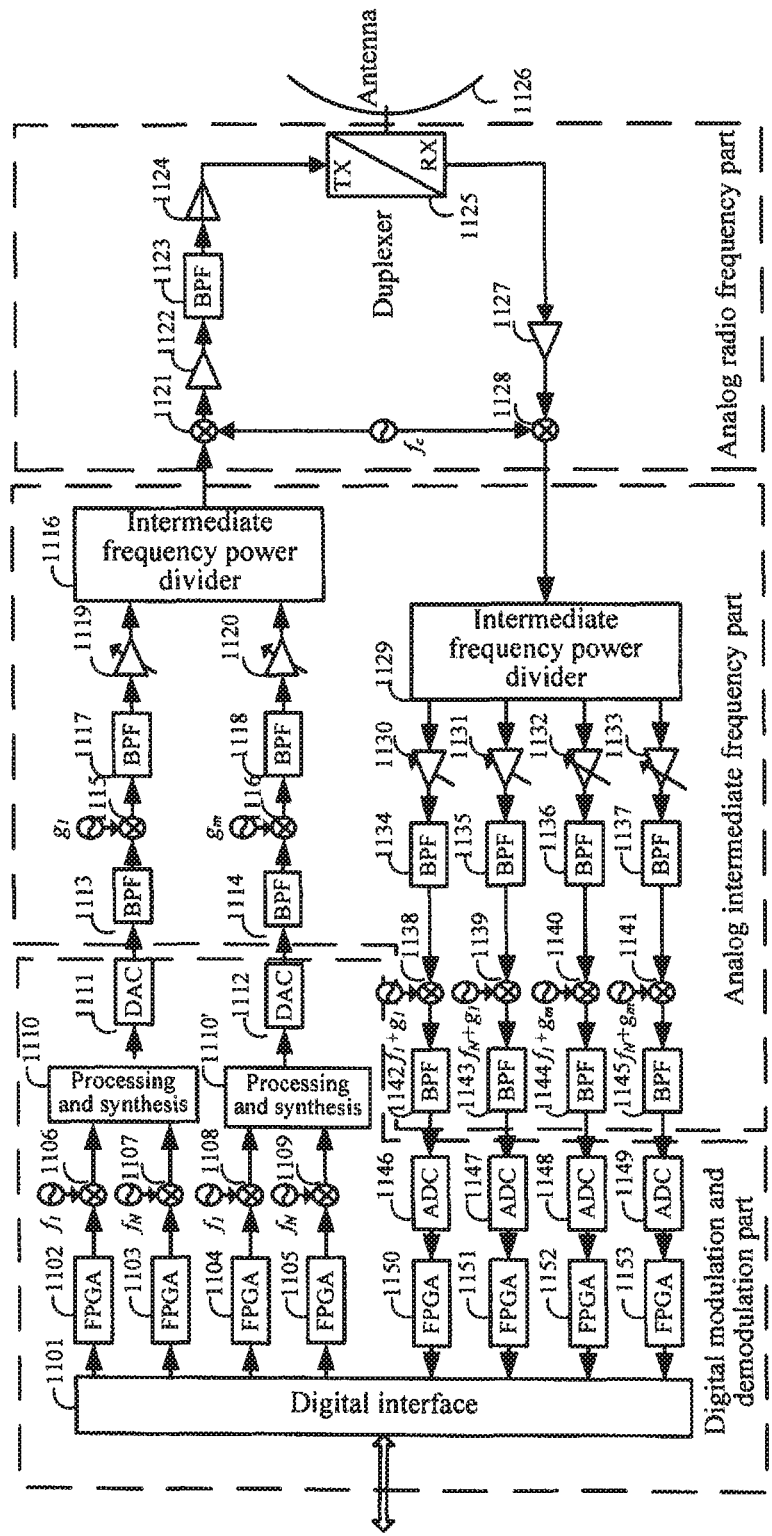
FIG. 11 is a schematic circuit diagram of a transceiver according to an eleventh embodiment of the present invention.

FIG. 11 is a schematic circuit diagram of a transceiver according to an eleventh embodiment of the present invention. A transmitting circuit in the transceiver in FIG. 11 is an example of the embodiment in FIG. 2.

Different from the embodiment in FIG. 10, the transmitting circuit of the transceiver in FIG. 11 may include M DACs, while a receiving circuit of the transceiver in FIG. 11 includes N×M ADCs, that is, the number of ADCs is N times the number of DACs.

Referring to FIG. 11, at a transmitting end, a digital interface circuit 1101 obtains data in a predetermined bandwidth (for example, 5 GHz), and decomposes the data into M×N parallel sub digital signal flows, where a bandwidth occupied by each sub digital signal flow is smaller than the predetermined bandwidth. For example, if data with a total bandwidth of 5 GHz is decomposed into 2×N sub digital signal flows (that is, 2×N subchannels), the bandwidth of each sub digital signal flow is 5/(2×N) GHz.

A digital modulation circuit formed by 2×N FPGAs 1102 to 1105 receives the 2×N sub digital signal flows, and modulates the 2×N sub digital signal flows to obtain 2×N modulated signals, where the 2×N FPGAs 1102 to 1105 correspond to the 2×N sub digital signal flows one by one. The center frequency of a modulated signal output by each FPGA is 1.2 GHz (assuming that N=2), and the bandwidth occupied by useful signals is 0.5750 GHz to 1.8250 GHz.

A frequency relocation circuit formed by N frequency mixers 1106 to 1107 and N local oscillators $f_1$ to $f_N$ receives N modulated signals output by the N FPGAs 1102 to 1103, and performs frequency mixing and frequency relocation on the N modulated signals. A frequency relocation circuit formed by another N frequency mixers 1108 to 1109 and N local oscillators whose frequencies are $f_1$ to $f_N$ receives N modulated signals output by the N FPGAs 1104 to 1105, and performs frequency mixing and frequency relocation on the N modulated signals. For example, assuming that N=2, if the center frequency of the modulated signal output by each FPGA is 1.2 GHz and the local oscillators choose frequencies $f_1$=0 GHz and $f_2$=1.25 GHz, after the frequency relocation is performed, center frequencies of modulated signals output by the frequency mixers 1106 to 1109 are changed to 1.2 GHz, 2.45 GHz, 1.2 GHz, and 2.45 GHz respectively.

A synthesizer 1110 synthesizes the N modulated signals that have undergone frequency relocation by the N frequency mixers 1006 to 1007 into a large bandwidth signal. A synthesizer 1110' synthesizes the N modulated signals that have undergone frequency relocation by the N frequency mixers 1008 to 1009 into a large bandwidth signal. For example, assuming that N=2, and $f_1$=0 GHz and $f_2$=1.25 GHz, the synthesizer 1110 and the synthesizer 1110' synthesize their two subbands into a large bandwidth signal of 2.5 GHz respectively, that is, 0.5750 GHz to 3.0750 GHz, and there is no frequency band gap between adjacent modulated signals.

A DAC 1111 and a DAC 1112 receive the two large bandwidth signals from the synthesizer 1110 and the synthesizer 1110' respectively, perform digital to analog conversion on the two large bandwidth signals to obtain analog signals, and output the analog signals to an up-conversion circuit.

The up-conversion circuit receives the analog signals output by the DAC 1111 and the DAC 1112, and converts the analog signals into radio frequency signals, so that the radio frequency signals are sent by an antenna. In the analog intermediate frequency part, the analog signals output by the DAC 1111 the DAC 1112 respectively are filtered by a BPF 1113 and a BPF 1114, and undergo intermediate frequency up-conversion and frequency relocation by a frequency mixer 1115 and a local oscillator $g_1$ and a frequency mixer 1116 and a local oscillator $g_m$; then the analog signals are filtered by a BPF 1117 and a BPF 1118, and are further amplified by an amplifier 1119 and an amplifier 1120; finally, after the two analog signals output and amplified by the amplifier 1119 and the amplifier 1120 are synthesized by an intermediate frequency power synthesizer 1116, the two analog signals are output to the analog radio frequency part, where a difference between $g_1$ and $g_m$ is 2.5 GHz, so that the intermediate frequency power synthesizer 1116 synthesizes the two analog signals into a large bandwidth signal of 5 GHz, that is, 0.5750 GHz to 5.5750 GHz. The analog radio frequency part in FIG. 11 includes a frequency mixer 1121, a local oscillator $f_c$, an amplifier 1122, a BPF 1123, and an amplifier 1124, which are similar to the units of the analog radio frequency part in FIG. 10 and are not further described herein. Finally, the analog signals output by the analog radio frequency part are transferred through a duplexer 1125 to an antenna 1126 for transmission.

An amplifier 1127, a frequency mixer 1128 and a local oscillator $f_c$, an intermediate frequency power divider 1129, amplifiers 1130 to 1133, BPFs 1134 to 1137, BPFs 1142 to 1145, ADCs 1146 to 1149 and FPGAs 1150 to 1153 of the receiving circuit in the transceiver in FIG. 11 have functions similar to those of the units of the receiving circuit in FIG. 10, which are not further described herein. The receiving circuit in FIG. 11 is different from the receiving circuit in FIG. 10 in that frequency mixers 1138 to 1139 and a local oscillators whose frequency is $f_1+g_1$ perform frequency relocation on analog signals output by the BPFs 1134 to 1135, while frequency mixers 1140 to 1141 and a local oscillator whose frequency is $f_m+g_m$ perform frequency relocation on analog signals output by the BPFs 1136 to 1137.

Figure 7A:
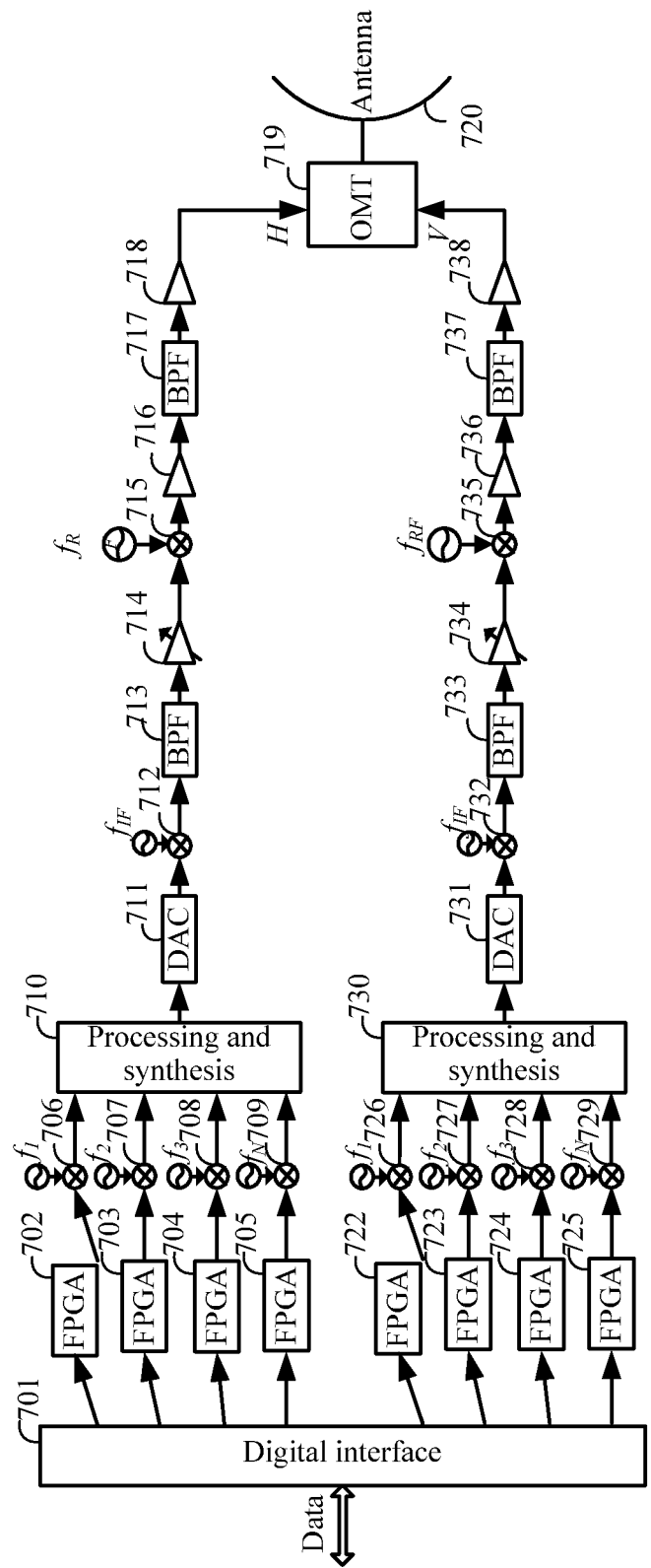
FIG. 7A and FIG. 7B are respectively schematic circuit diagrams of a transmitting circuit and a receiving circuit according to a seventh embodiment of the present invention.
Figure 7B:
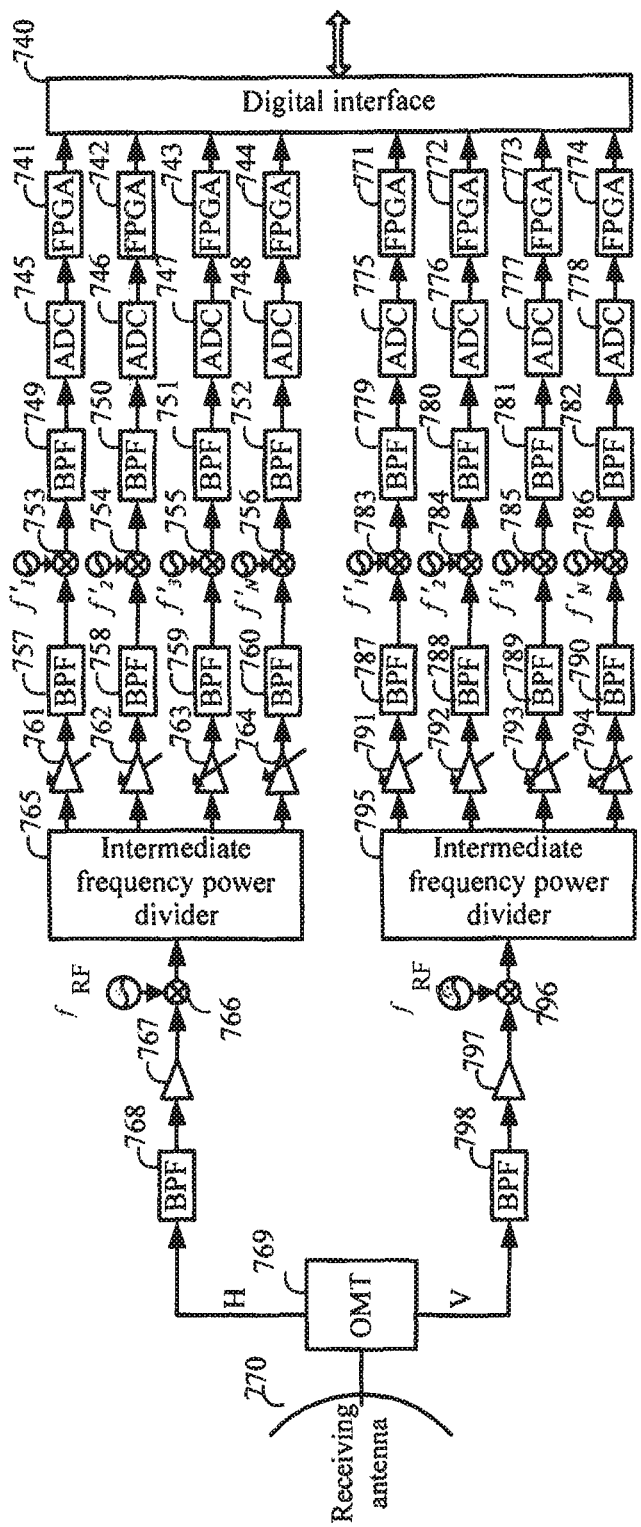

FIG. 7A and FIG. 7B are respectively schematic circuit diagrams of a transmitting circuit and a receiving circuit according to a seventh embodiment of the present invention. The transmitting circuit and the receiving circuit in FIG. 7A and FIG. 7B are an example of the embodiment in FIG. 4.

The transmitting circuit of the embodiment in FIG. 7A modulates a large bandwidth signal on an H-polarized antenna and a V-polarized antenna respectively to obtain an H-polarized signal and a V-polarized signal, and then sends the H-polarized signal and the V-polarized signal through a dual-polarized antenna. The receiving circuit in FIG. 7B receives the H-polarized signal and the V-polarized signal from the dual-polarized antenna and demodulates the H-polarized signal and the V-polarized signal.

An antenna 720 of the transmitting circuit and an antenna 770 of the receiving circuit are dual-polarized antennas. A digital modulation circuit modulates N sub digital signal flows on the H-polarized antenna and the V-polarized antenna respectively. The embodiment in FIG. 7A includes a DAC 711 and a DAC 731 that correspond to the H-polarized antenna and the V-polarized antenna respectively.

Referring to FIG. 7A, at a transmitting end, corresponding to the H-polarized antenna, a digital interface circuit 701 obtains data in a predetermined bandwidth (for example, 5 GHz), and decomposes the data into N parallel sub digital signal flows. Similarly, corresponding to the DAC 731, the digital interface circuit 701 can obtain N sub digital signal flows.

A transmitting circuit corresponding to the H-polarized antenna includes N FPGAs 702 to 705, N frequency mixers 706 to 709, local oscillators whose frequencies are $f_1$ to $f_N$, a synthesizer 710, the DAC 711, a frequency mixer 712, a local oscillator whose frequency is $f_{IF}$, a BPF 713, an amplifier 714, a frequency mixer 715, a local oscillator whose frequency is $f_{RF}$, an amplifier 716, a BPF 717, and an amplifier 718. Functions of these units are similar to those of the corresponding units of the transmitting circuit in FIG. 10, which are not further described herein. A transmitting circuit corresponding to the V-polarized antenna includes N FPGAs 722 to 725, N frequency mixers 726 to 729, local oscillators whose frequencies are $f_1$ to $f_N$, a synthesizer 730, the DAC 731, a frequency mixer 732, a local oscillator whose frequency is $f_{IF}$, a BPF 733, an amplifier 734, a frequency mixer 735, a local oscillator whose frequency is $f_{RF}$, an amplifier 736, a BPF 737, and an amplifier 738. Similarly, functions of these units are similar to those of the corresponding units of the transmitting circuit in FIG. 10, which are not further described herein. The transmitting circuit in FIG. 7A is different from the transmitting circuit in FIG. 10 in that the amplifier 718 and the amplifier 738 send the H-polarized signal and the V-polarized signal to a coupler (orthomode transducer (OMT)) 719 respectively, and the coupler 719 converts the H-polarized signal and the V-polarized signal into a dual-polarized signal, and outputs the dual-polarized signal to a dual-polarized antenna 720.

Referring to FIG. 7B, at a receiving end, a coupler 769 converts a dual-polarized signal received from a dual-polarized antenna 770 into an H-polarized signal and a V-polarized signal.

A receiving circuit corresponding to the H-polarized antenna includes a BPF 768, an amplifier 767, a frequency mixer 766, and a local oscillator $f_{RF}$, an intermediate frequency power divider 765, amplifiers 761 to 764, BPFs 757 to 760, frequency mixers 753 to 756, local oscillators whose frequencies are $f_1'$ to $f_N'$, BPFs 749 to 752, ADCs 745 to 748, and FPGAs 741 to 744. These units are similar to the units of the receiving circuit in FIG. 10, which are not further described herein. A receiving circuit corresponding to the V-polarized antenna includes a BPF 798, an amplifier 797, a frequency mixer 796, and a local oscillator $f_{RF}$, an intermediate frequency power divider 795, amplifiers 791 to 794, BPFs 787 to 790, frequency mixers 783 to 786, local oscillators whose frequencies are $f_1'$ to $f_N'$, BPFs 779 to 782, ADCs 775 to 778, and FPGAs 771 to 774. These units are similar to the units of the receiving circuit in FIG. 10, which are not further described herein. The receiving circuit in FIG. 7B is different from the receiving circuit in FIG. 10 in that the coupler 769 receives a dual-polarized signal from the dual-polarized antenna 770, converts the dual-polarized signal into an H-polarized signal and a V-polarized signal, and outputs the H-polarized signal and the V-polarized signal to a BPF 768 and a BPF 798 respectively.

Figure 8A:
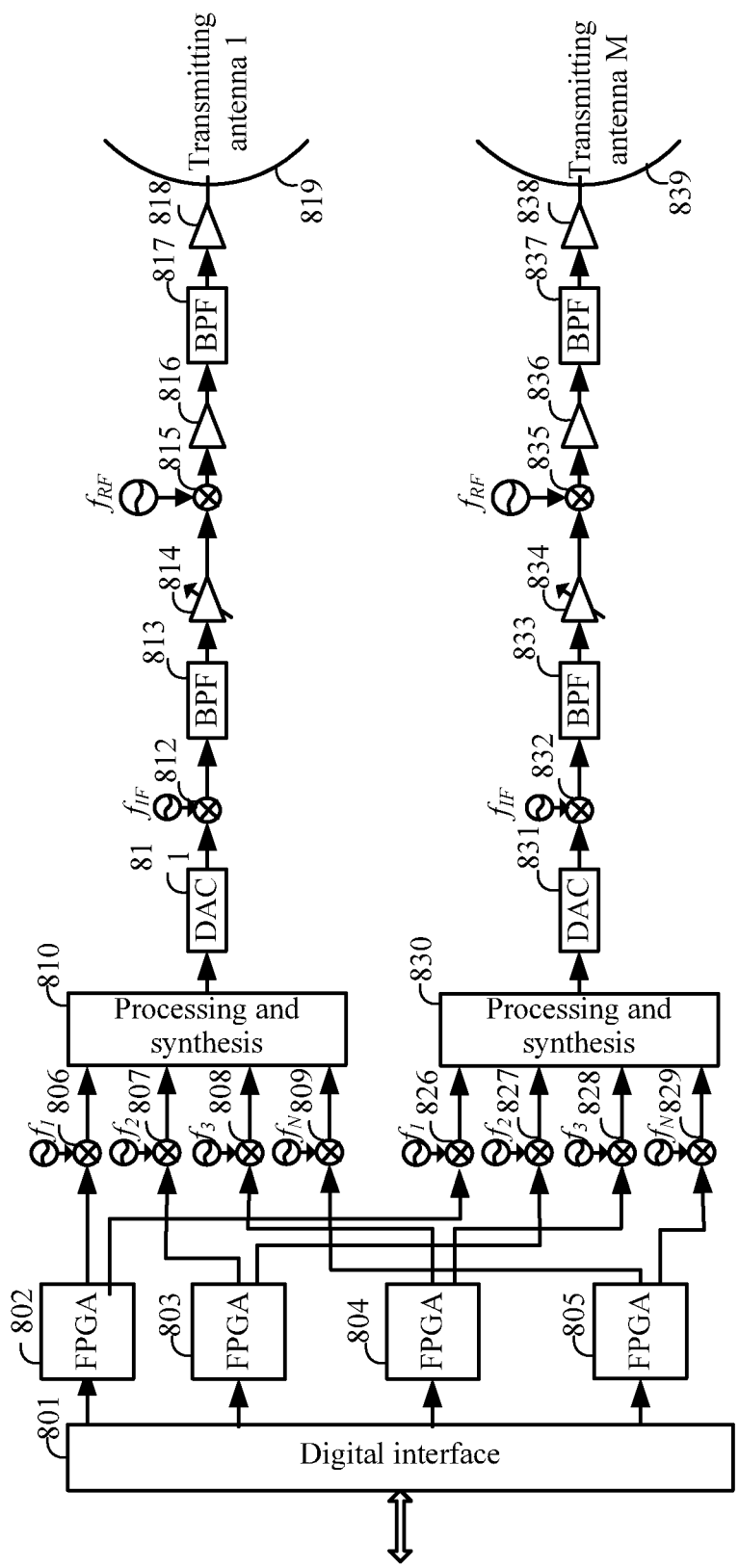
FIG. 8A and FIG. 8B are respectively schematic circuit diagrams of a transmitting circuit and a receiving circuit according to an eighth embodiment of the present invention.
Figure 8B:
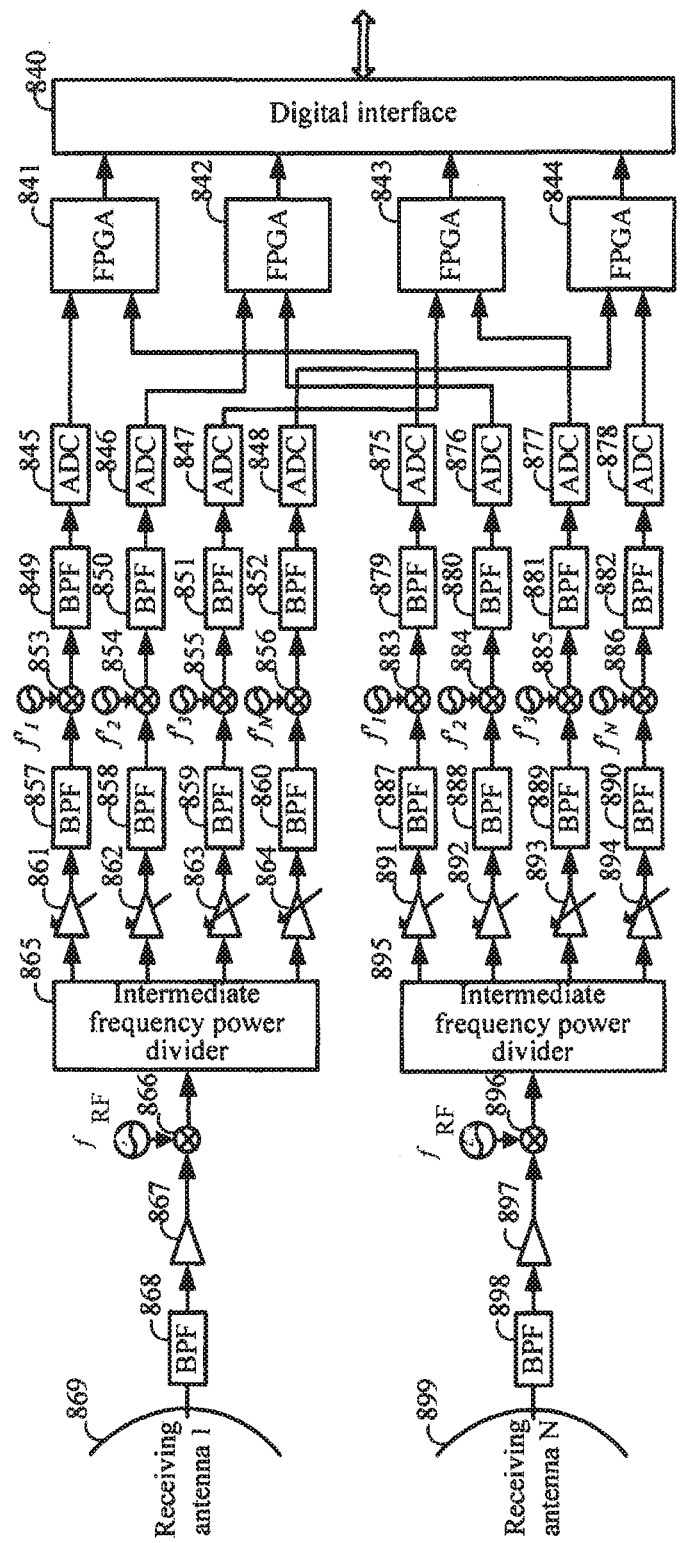

FIG. 8A and FIG. 8B are respectively schematic circuit diagrams of a transmitting circuit and a receiving circuit according to an eighth embodiment of the present invention. The transmitting circuit and the receiving circuit in FIG. 8A and FIG. 8B are an example of the embodiment in FIG. 3.

The transmitting circuit in the embodiment in FIG. 8A corresponds to multiple antennas antenna 1 819 to antenna M 839, and the receiving circuit in FIG. 8B corresponds to multiple antennas antenna 1 869 to antenna N 899.

At a transmitting end, a large bandwidth signal is modulated on each antenna, and then the modulated signal is sent through each antenna. At a receiving end, multiple signals are received and demodulated on each antenna.

Referring to FIG. 8A, at a transmitting end, corresponding to each antenna, a digital interface circuit 801 obtains data in a predetermined bandwidth (for example, 5 GHz), and decomposes the data into N parallel sub digital signal flows.

Corresponding to antenna 1, a transmitting circuit includes N FPGAs 802 to 805, N frequency mixers 806 to 809, local oscillators whose frequencies are $f_1$ to $f_N$, a synthesizer 810, a DAC 811, a frequency mixer 812, a local oscillator whose frequency is $f_{IF}$, a BPF 813, an amplifier 814, a frequency mixer 815, a local oscillator whose frequency is $f_{RF}$, an amplifier 816, a BPF 817, and an amplifier 818. Functions of these units are similar to those of the corresponding units of the transmitting circuit in FIG. 10, which are not further described herein. Corresponding to antenna M, a transmitting circuit includes N FPGAs 802 to 805, N frequency mixers 826 to 829, local oscillators whose frequencies are $f_1$ to $f_N$, a synthesizer 830, a DAC 831, a frequency mixer 832, a local oscillator whose frequency is $f_{IF}$, a BPF 833, an amplifier 834, a frequency mixer 835, a local oscillator whose frequency is $f_{RF}$, an amplifier 836, a BPF 837, and an amplifier 838. Functions of these units are similar to those of the corresponding units of the transmitting circuit in FIG. 10, which are not further described herein. The transmitting circuit in FIG. 8A is different from the transmitting circuit in FIG. 10 in that the amplifier 818 and the amplifier 838 output a radio frequency signal to antenna 1 and antenna M respectively.

As can be seen from the above, sub digital signal flows of the transmitting circuit corresponding to antenna 1 and sub digital signal flows of the transmitting circuit corresponding to antenna M undergo digital modulation using the same FPGAs. For example, two modulated signals output by the FPGA 802 are output to the frequency mixer 806 and the frequency mixer 826 respectively, and two modulated signals output by the FPGA 803 are output to the frequency mixer 807 and the frequency mixer 827 respectively, and the like.

Referring to FIG. 8B, at a receiving end, a receiving circuit corresponding to antenna 1 includes a BPF 868, an amplifier 867, a frequency mixer 866, and a local oscillator $f_{RF}$, an intermediate frequency power divider 865, amplifiers 861 to 864, BPFs 857 to 860, frequency mixers 853 to 856, local oscillators whose frequencies are $f_1'$ to $f_N'$, BPFs 849 to 852, ADCs 845 to 848, and FPGAs 841 to 844. These units are similar to the units of the receiving circuit in FIG. 10, which are not further described herein. A receiving circuit corresponding to antenna N includes a BPF 898, an amplifier 897, a frequency mixer 896, and a local oscillator $f_{RF}$, an intermediate frequency power divider 895, amplifiers 891 to 894, BPFs 887 to 890, frequency mixers 883 to 886, local oscillators whose frequencies are $f_1'$ to $f_N'$, BPFs 879 to 882, ADCs 875 to 878, and FPGAs 841 to 844. These units are similar to the units of the receiving circuit in FIG. 10, which are not further described herein. The receiving circuit in FIG. 8B is different from the transmitting circuit in FIG. 10 in that the BPF 868 and the BPF 898 receive a radio frequency signal from antenna 1 and antenna N respectively.

As can be seen from the above, sub digital signal flows of the receiving circuit corresponding to antenna 1 and sub digital signal flows of the receiving circuit corresponding to antenna N undergo digital demodulation using the same FPGAs. For example, the ADC 845 and the ADC 875 each output a digital signal to the FPGA 841 for digital demodulation, and the ADC 846 and the ADC 876 each output a digital signal to the FPGA 842 for digital demodulation, and the like.

Figure 9A:
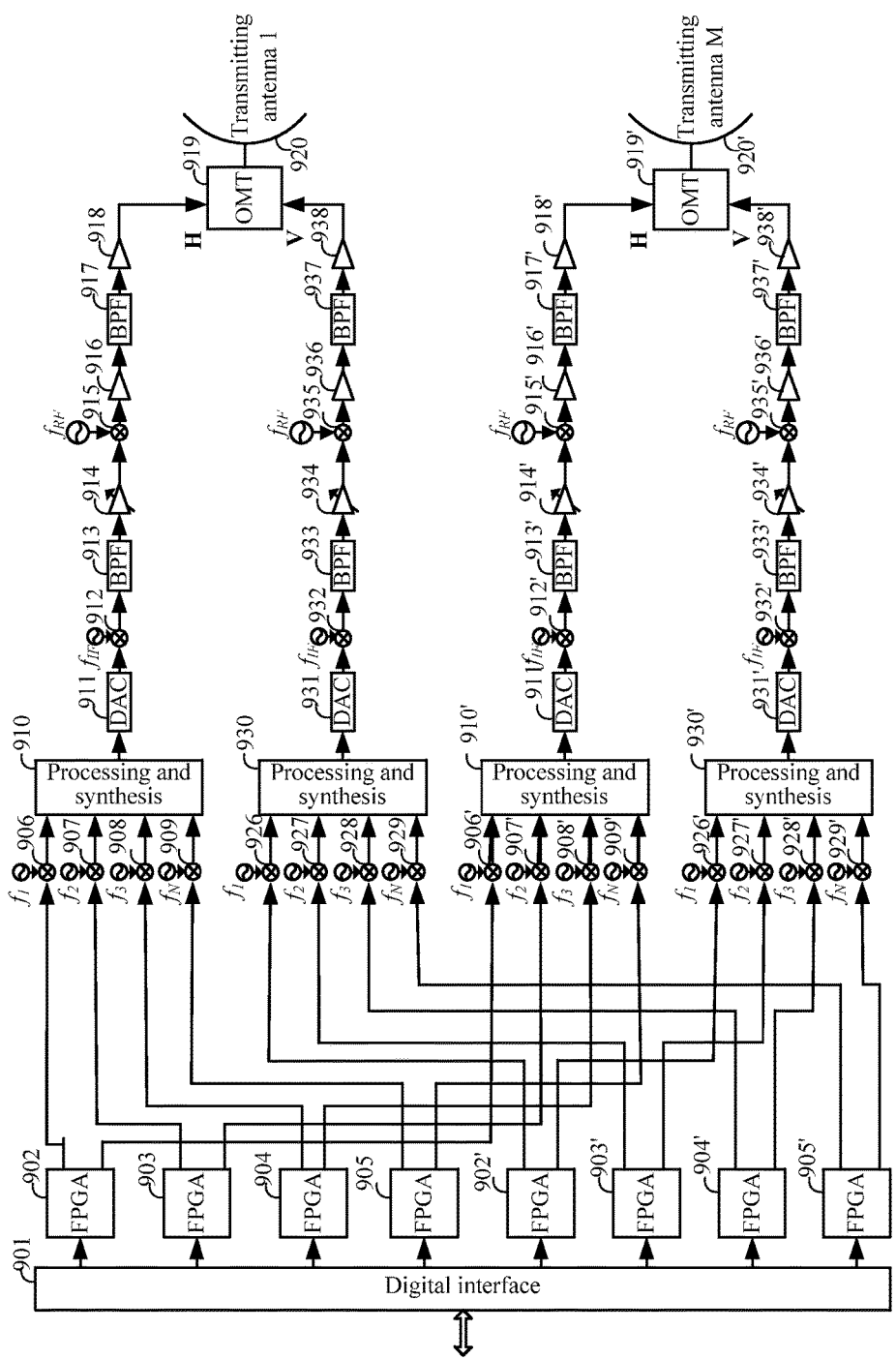
FIG. 9A and FIG. 9B are respectively schematic circuit diagrams of a transmitting circuit and a receiving circuit according to a ninth embodiment of the present invention.
Figure 9B:
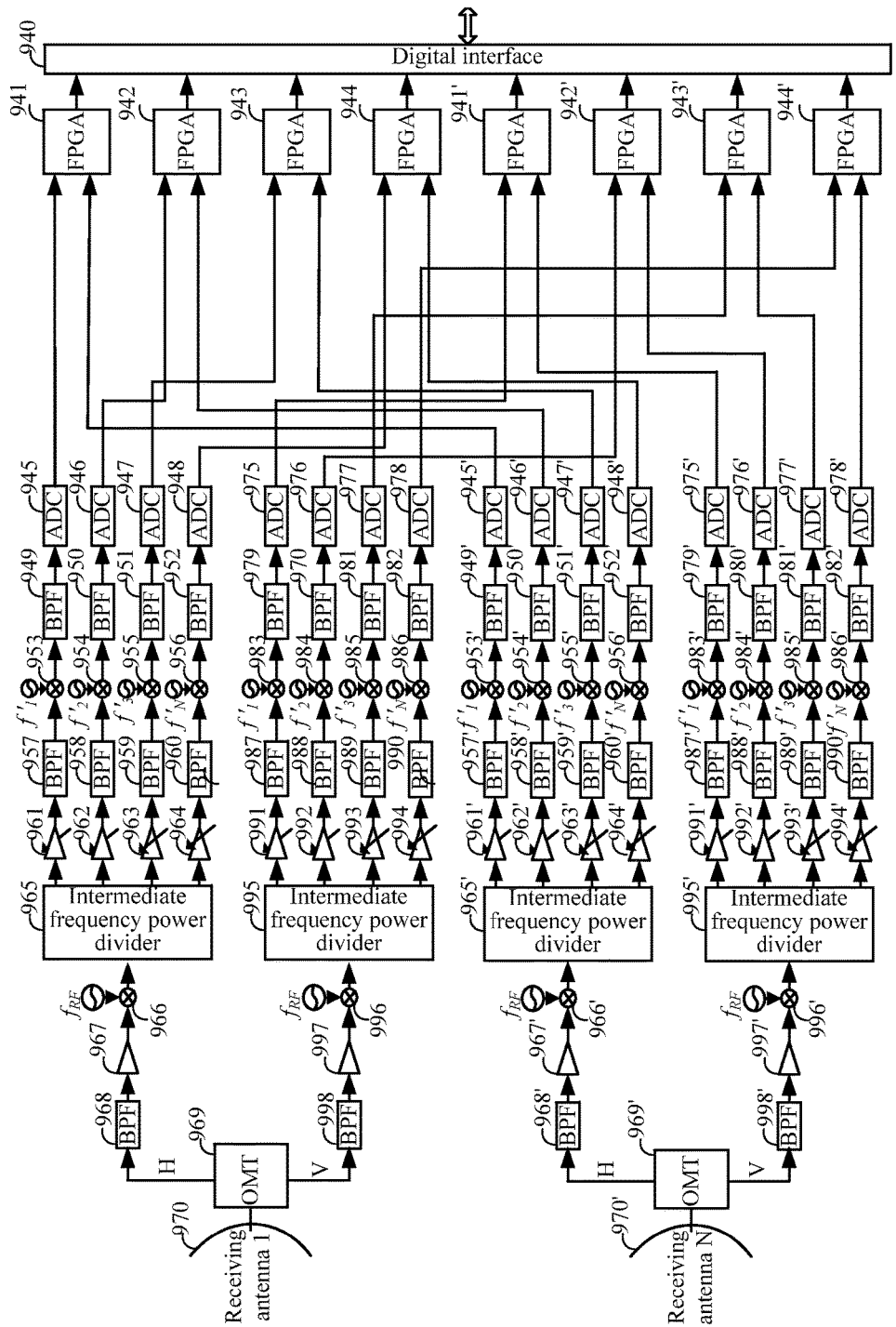

FIG. 9A and FIG. 9B are respectively schematic circuit diagrams of a transmitting circuit and a receiving circuit according to a ninth embodiment of the present invention. The transmitting circuit and the receiving circuit in FIG. 9A are an example of a combination of FIG. 3 and FIG. 4.

The embodiment in FIG. 9A includes transmitting circuits corresponding to multiple dual-polarized antennas dual-polarized antenna 1 to dual-polarized antenna M, and the embodiment in FIG. 9B includes receiving circuits corresponding to multiple dual-polarized antennas dual-polarized antenna 1 to dual-polarized antenna N. In addition, the transmitting circuit corresponding to each dual-polarized antenna modulates a large bandwidth signal on an H-polarized antenna and a V-polarized antenna respectively to obtain an H-polarized signal and a V-polarized signal, and sends the H-polarized signal and the V-polarized signal through the dual-polarized antenna, and the receiving circuit corresponding to each dual-polarized antenna receives the H-polarized signal and the V-polarized signal from the dual-polarized antenna and demodulates the H-polarized signal and the V-polarized signal.

At a transmitting end, a transmitting circuit corresponding to dual-polarized antenna 1 includes a transmitting circuit corresponding to the H-polarized antenna and a transmitting circuit corresponding to the V-polarized antenna. The transmitting circuit corresponding to the H-polarized antenna includes N FPGAs 902 to 905, N frequency mixers 906 to 909, local oscillators whose frequencies are $f_1$ to $f_N$, a synthesizer 910, a DAC 911, a frequency mixer 912, a local oscillator whose frequency is $f_{IF}$, a BPF 913, an amplifier 914, a frequency mixer 915, a local oscillator whose frequency is $f_{RF}$, an amplifier 916, a BPF 917, and an amplifier 918. The amplifier 918 is connected to a coupler 919, and the coupler 919 is connected to an antenna 920. Functions of these units are similar to those of the corresponding units of the transmitting circuit in FIG. 7A, which are not further described herein. The transmitting circuit corresponding to the V-polarized antenna includes N FPGAs 902' to 905', N frequency mixers 926 to 929, local oscillators whose frequencies are $f_1$ to $f_N$, a synthesizer 930, a DAC 931, a frequency mixer 932, a local oscillator $f_{IF}$, a BPF 933, an amplifier 934, a frequency mixer 935, a local oscillator whose frequency is $f_{RF}$, an amplifier 936, a BPF 937, and an amplifier 938. The amplifier 938 is connected to the coupler 919, and the coupler 919 is connected to the antenna 920. Functions of these units are similar to those of the corresponding units of the transmitting circuit in FIG. 7B, which are not further described herein.

At the transmitting end, the transmitting circuit corresponding to dual-polarized antenna M includes a transmitting circuit corresponding to the H-polarized antenna and a transmitting circuit corresponding to the V-polarized antenna. The transmitting circuit corresponding to the H-polarized antenna includes N FPGAs 902 to 905, N frequency mixers 906' to 909', local oscillators whose frequencies are $f_1$ to $f_N$, a synthesizer 910', a DAC 911', a frequency mixer 912', a local oscillator $f_{IF}$, a BPF 913', an amplifier 914', a frequency mixer 915', a local oscillator whose frequency is $f_{RF}$, an amplifier 916', a BPF 917', and an amplifier 918'. The amplifier 918' is connected to a coupler 919', and the coupler 919' is connected to an antenna 920'. Functions of these units are similar to those of the corresponding units of the transmitting circuit in FIG. 7A, which are not further described herein. The transmitting circuit corresponding to the V-polarized antenna includes N FPGAs 902' to 905', N frequency mixers 926' to 929', local oscillators whose frequencies are $f_1$ to $f_N$, a synthesizer 930', a DAC 931', a frequency mixer 932', a local oscillator $f_{IF}$, a BPF 933', an amplifier 934', a frequency mixer 935', a local oscillator whose frequency is $f_{RF}$, an amplifier 936', a BPF 937', and an amplifier 938'. The amplifier 938' is connected to the coupler 919', and the coupler 919' is connected to the antenna 920'. Functions of these units are similar to those of the corresponding units of the transmitting circuit in FIG. 7B, which are not further described herein.

At a receiving end, the receiving circuit corresponding to dual-polarized antenna 1 970 includes a receiving circuit corresponding to the H-polarized antenna and a receiving circuit corresponding to the V-polarized antenna. The receiving circuit corresponding to the H-polarized antenna includes a BPF 968, an amplifier 967, a frequency mixer 966, and a local oscillator $f_{RF}$, an intermediate frequency power divider 965, amplifiers 961 to 964, BPFs 957 to 960, frequency mixers 953 to 956, local oscillators whose frequencies are $f_1'$ to $f_N'$, BPFs 949 to 952, ADCs 945 to 948, and FPGAs 941 to 944. These units are similar to the units of the receiving circuit in FIG. 7A, which are not further described herein. The receiving circuit corresponding to the V-polarized antenna includes a BPF 998, an amplifier 997, a frequency mixer 996, and a local oscillator far, an intermediate frequency power divider 995, amplifiers 991 to 994, BPFs 987 to 990, frequency mixers 983 to 986, local oscillators whose frequencies are $f_1'$ to $f_N'$, BPFs 979 to 982, ADCs 975 to 978, and FPGAs 941' to 944'. These units are similar to the units of the receiving circuit in FIG. 7B, which are not further described herein.

At the receiving end, the receiving circuit corresponding to dual-polarized antenna N 970' includes a receiving circuit corresponding to the H-polarized antenna and a receiving circuit corresponding to the V-polarized antenna. The receiving circuit corresponding to the H-polarized antenna includes a BPF 968', an amplifier 967', a frequency mixer 966', and a local oscillator $f_{RF}$, an intermediate frequency power divider 965', amplifiers 961' to 964', BPFs 957' to 960', frequency mixers 953' to 956', local oscillators whose frequencies are $f_1'$ to $f_N'$, BPFs 949' to 952', ADCs 945' to 948', and FPGAs 941' to 944'. These units are similar to the units of the receiving circuit in FIG. 7B, which are not further described herein. The receiving circuit corresponding to the V-polarized antenna includes a BPF 998', an amplifier 997', a frequency mixer 996', and a local oscillator far, an intermediate frequency power divider 995', amplifiers 991' to 994', BPFs 987' to 990', frequency mixers 983' to 986', local oscillators whose frequencies are $f_1'$ to $f_N'$, BPFs 979' to 982', ADCs 975' to 978', and FPGAs 941' to 944'. These units are similar to the units of the receiving circuit in FIG. 7B, which are not further described herein.

The transmitting circuit, the transceiver, and the communication system according to the embodiments of the present invention have been described above. The following describes a method for transmitting data and a method for transmitting data according to the embodiments of the present invention with reference to FIG. 13 to FIG. 15.

Figure 13:
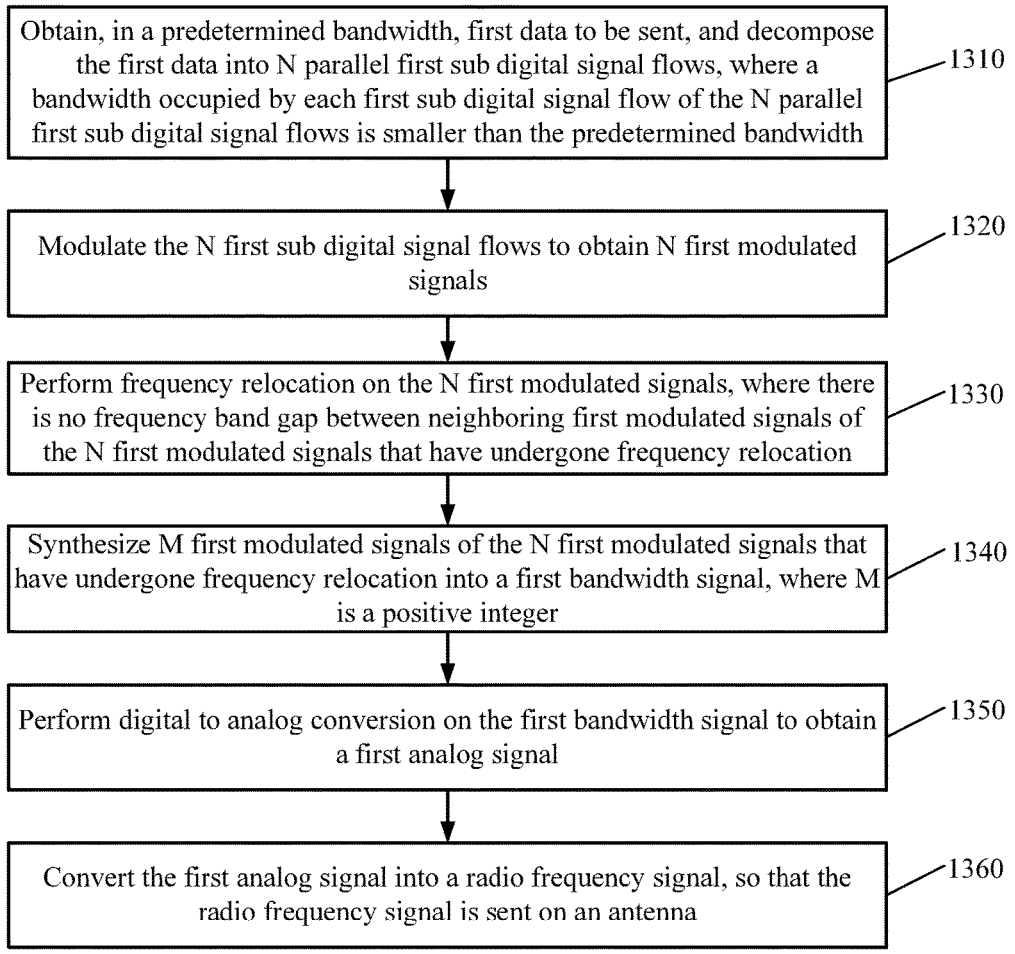
FIG. 13 is a schematic flowchart of a method for transmitting data according to a twelfth embodiment of the present invention.

FIG. 13 is a schematic flowchart of a method for transmitting data according to a twelfth embodiment of the present invention. The method for transmitting data includes the following content:

1310. Obtain, in a predetermined bandwidth, first data to be sent, and decompose the first data into N parallel first sub digital signal flows, where a bandwidth occupied by each first sub digital signal flow of the N first sub digital signal flows is smaller than the predetermined bandwidth and N is a positive integer.

1320. Modulate the N first sub digital signal flows to obtain N first modulated signals.

1330. Perform frequency relocation on the N first modulated signals, so that there is no frequency band gap between adjacent first modulated signals of the N first modulated signals that have undergone frequency relocation.

1340. Synthesize M first modulated signals of the N first modulated signals that have undergone frequency relocation into a first bandwidth signal, where M is a positive integer.

1350. Perform digital to analog conversion on the first bandwidth signal to obtain a first analog signal.

1360. Convert the first analog signal into a radio frequency signal, so that the radio frequency signal is sent by an antenna.

According to the embodiment of the present invention, data can be decomposed into multiple parallel sub digital signal flows; modulation and frequency relocation are performed on the multiple sub digital signal flows respectively, and then the multiple sub digital signal flows are synthesized into a large bandwidth signal; further, the large bandwidth signal is converted into an analog signal using a digital to analog converter, and finally the analog signal is converted into a radio frequency signal through up-conversion. Because the embodiment of the present invention can divide a large bandwidth into multiple subbands and can process multiple sub digital signal flows at a transmitting end and a receiving end independently, no complex post-processing needs to be performed on the analog signal after the digital to analog conversion is performed, which can reduce the signal processing complexity of a transceiver, thereby improving system performance.

Optionally, as another embodiment, the method in FIG. 13 further includes synthesizing L first modulated signals of the N first modulated signals that have undergone frequency relocation into a second bandwidth signal, where the L first modulated signals are different from the M first modulated signals; and performing digital to analog conversion on the second bandwidth signal to obtain a second analog signal; in 1306, the first analog signal and the second analog signal may be synthesized into the radio frequency signal.

Optionally, as another embodiment, the method in FIG. 13 further includes performing frequency relocation on the first analog signal and the second analog signal respectively before synthesizing the first analog signal and the second analog signal into the radio frequency signal.

Optionally, as another embodiment, the method in FIG. 13 further includes obtaining, in the predetermined bandwidth, second data to be sent, and decomposing the second data into N parallel second sub digital signal flows, where a bandwidth occupied by each second sub digital signal flow of the N second sub digital signal flows is smaller than the predetermined bandwidth and M=N; modulating the N second sub digital signal flows to obtain N second modulated signals, performing frequency relocation on the N second modulated signals, where there is no frequency band gap between adjacent second modulated signals of the N second modulated signals that have undergone frequency relocation; synthesizing the N second modulated signals that have undergone frequency relocation into a second bandwidth signal; and performing digital to analog conversion on the second bandwidth signal to obtain a second analog signal; in 1360, the first analog signal is converted into a first radio frequency signal, so that the first radio frequency signal is sent by a first antenna, and the second analog signal is converted in a second radio frequency signal, so that the second radio frequency signal is sent by a second antenna.

In 1320, the N first sub digital signal flows may be modulated using N modulators, and the N second sub digital signal flows may be modulated using the N modulators.

According to the embodiment of the present invention, the antenna is a dual-polarized antenna, in 1320, the N first sub digital signal flows may be modulated on an H-polarized antenna, where M=N. The method in FIG. 13 further includes obtaining, in the predetermined bandwidth, second data to be sent, and decomposing the second data into K parallel second sub digital signal flows, where a bandwidth occupied by each second sub digital signal flow of the K second sub digital signal flows is smaller than the predetermined bandwidth and K is a positive integer; modulating the K second sub digital signal flows on a V-polarized antenna to obtain K second modulated signals; performing frequency relocation on the K second modulated signals, where there is no frequency band gap between adjacent second modulated signals of the K second modulated signals that have undergone frequency relocation; synthesizing the K second modulated signals that have undergone frequency relocation into a second bandwidth signal; and performing digital to analog conversion on the second bandwidth signal to obtain a second analog signal; in 1360, the first analog signal may be converted into a first radio frequency signal and the second analog signal is received, and the second analog signal is converted into a second radio frequency signal; and the first radio frequency signal and the second radio frequency signal are coupled, so that the first radio frequency signal and the second radio frequency signal are sent by the dual-polarized antenna.

In 1320, the N first sub digital signal flows may be modulated using N modulators, and the K second sub digital signal flows may be modulated using K modulators.

In 1340, the N first modulated signals that have undergone frequency relocation may be added using an adder to synthesize the modulated signals into a first bandwidth signal.

According to the embodiment of the present invention, N is at least 4, and the first data is at least one binary digital signal flow.

Figure 14:
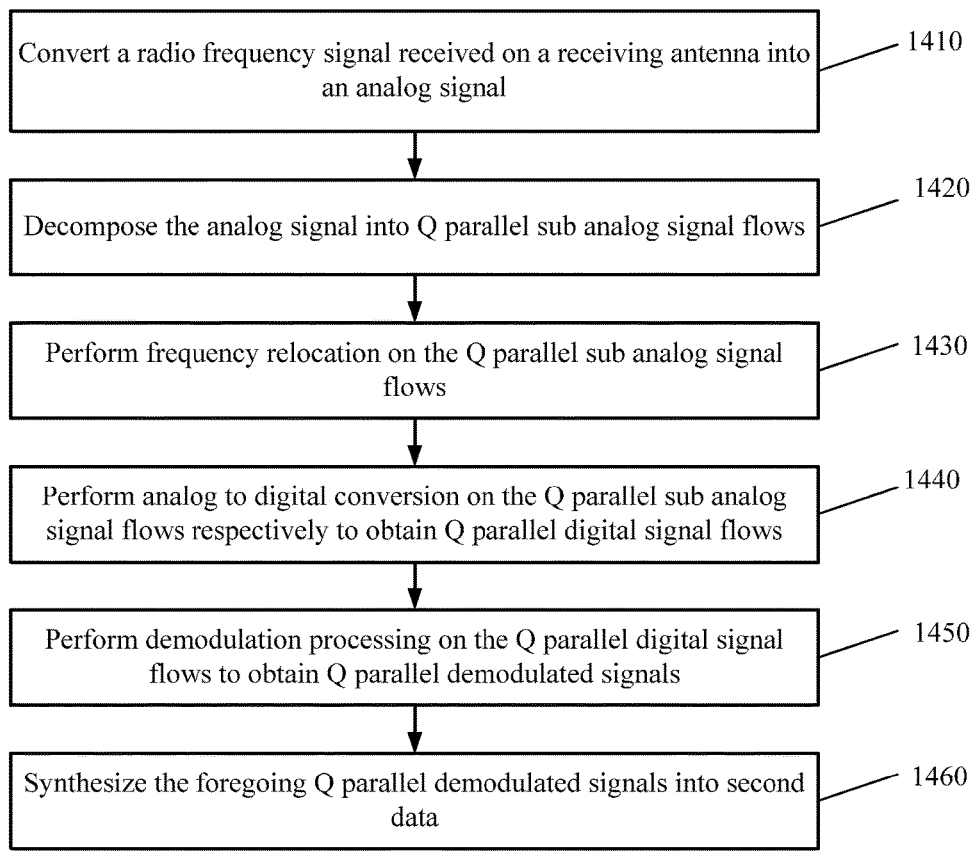
FIG. 14 is a schematic flowchart of a method for transmitting data according to a thirteenth embodiment of the present invention.

FIG. 14 is a schematic flowchart of a method for transmitting data according to a thirteenth embodiment of the present invention.

The method for transmitting data in FIG. 14 includes a method for receiving data and the method for transmitting data in FIG. 13, where the method for receiving data includes the following content.

1410. Convert a radio frequency signal received on a receiving antenna into an analog signal.

1420. Decompose the analog signal into Q parallel sub analog signal flows.

1430. Perform frequency relocation on the Q parallel sub analog signal flows.

1440. Perform analog to digital conversion on the Q parallel sub analog signal flows respectively to obtain Q parallel digital signal flows.

1450. Perform demodulation processing on the Q parallel digital signal flows to obtain Q parallel demodulated signals.

1460. Synthesize the Q parallel demodulated signals into second data, where Q may be equal to N in applications.

According to the embodiment of the present invention, data can be decomposed into multiple parallel sub digital signal flows; modulation and frequency relocation are performed on the multiple sub digital signal flows respectively, and then the multiple sub digital signal flows are synthesized into a large bandwidth signal; further, the large bandwidth signal is converted into an analog signal using a digital to analog converter, and finally the analog signal is converted into a radio frequency signal through up-conversion. Because the embodiment of the present invention can divide a large bandwidth into multiple subbands and can process multiple sub digital signal flows at a transmitting end and a receiving end independently, no complex post-processing needs to be performed on the analog signal after the digital to analog conversion is performed, which can reduce the signal processing complexity of a transceiver, thereby improving system performance.

Figure 15:
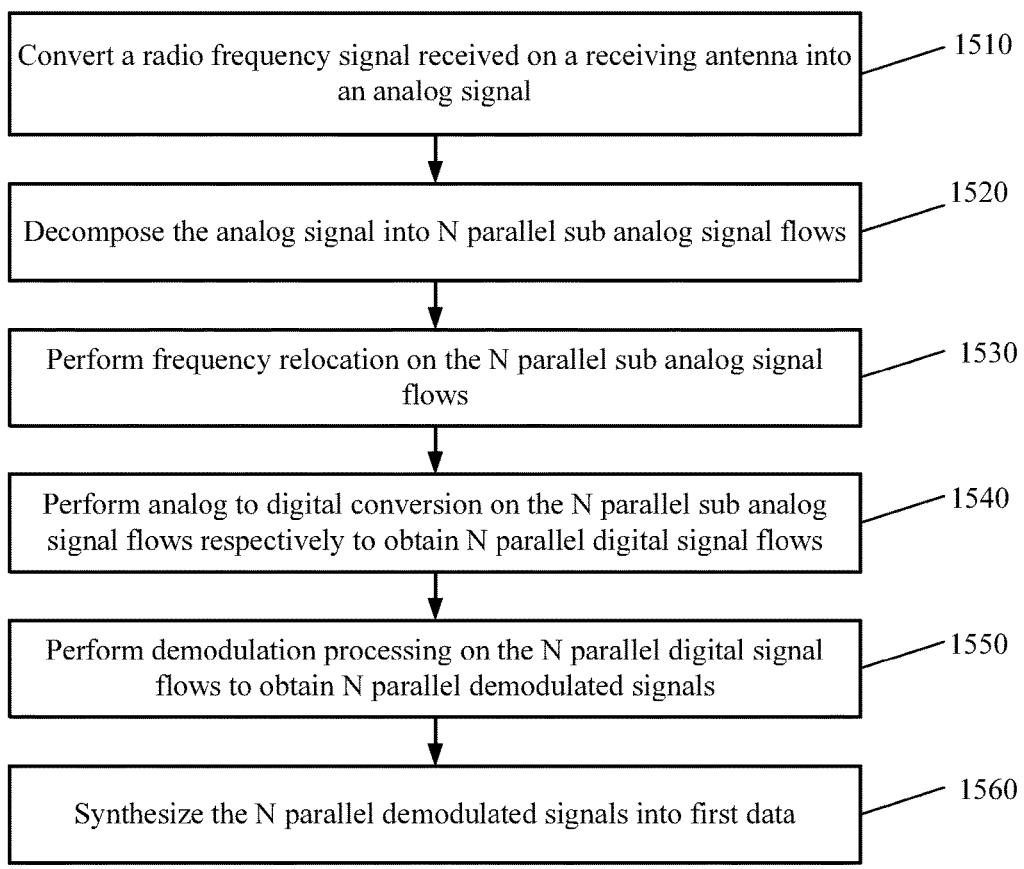
FIG. 15 is a schematic flowchart of a communication method according to a fourteenth embodiment of the present invention.

FIG. 15 is a schematic flowchart of a communication method according to a fourteenth embodiment of the present invention.

The communication method in FIG. 15 includes a method for receiving data and the method for transmitting data in FIG. 13, where the method for receiving data includes the following content.

1510. Convert a radio frequency signal received on a receiving antenna into an analog signal.

1520. Decompose the analog signal into N parallel sub analog signal flows.

1530. Perform frequency relocation on the N parallel sub analog signal flows.

1540. Perform analog to digital conversion on the N parallel sub analog signal flows respectively to obtain N parallel digital signal flows.

1550. Perform demodulation processing on the N parallel digital signal flows to obtain N parallel demodulated signals.

1560. Synthesize the N parallel demodulated signals into first data.

According to the embodiment of the present invention, data can be decomposed into multiple parallel sub digital signal flows; modulation and frequency relocation are performed on the multiple sub digital signal flows respectively, and then the multiple sub digital signal flows are synthesized into a large bandwidth signal; further, the large bandwidth signal is converted into an analog signal using a digital to analog converter, and finally the analog signal is converted into a radio frequency signal through up-conversion. Because the embodiment of the present invention can divide a large bandwidth into multiple subbands and can process multiple sub digital signal flows at a transmitting end and a receiving end independently, no complex post-processing needs to be performed on the analog signal after the digital to analog conversion is performed, which can reduce the signal processing complexity of a transceiver, thereby improving system performance.

Compared with the technical solution in the prior art where a processing speed of a DAC/ADC is increased using a frequency domain method or a time domain method, the embodiments of the present invention have a lower complexity during signal processing, signals are not easily distorted, and no joint control on multiple DACs/ADCs exists. Compared with the technical solution where a signal bandwidth is reduced in the prior art, the present invention reduces the number of DACs and requirements for analog intermediate frequency processing devices of a transmitting end. Compared with the existing frequency domain multichannel technology, the present invention does not need to reserve a guard space between each channel. In addition, frequency bands can be divided freely without restriction, and the system features powerful scalability. Furthermore, the embodiments of the present invention provide a complete one-to-one sending and receiving solution, and support a system with multi-polarized antennas and/or multiple antennas.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to the corresponding process in the foregoing method embodiments, and the details will not be described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication system comprising:
a transmitter; and
a receiver coupled to the transmitter,
wherein the transmitter comprises a transmitting circuit comprising:
a digital interface circuit configured to:
obtain, in a predetermined bandwidth, first data to be sent; and
decompose the first data into N parallel first sub digital signal flows, wherein a bandwidth occupied by each first sub digital signal flow of the N parallel first sub digital signal flows is less than the predetermined bandwidth, and wherein N is a positive integer greater than 1;
a digital modulation circuit coupled to the digital interface circuit and configured to:
receive the N parallel first sub digital signal flows; and
modulate the N parallel first sub digital signal flows to obtain N first modulated signals;
a first frequency relocation circuit coupled to the digital modulation circuit and configured to:
receive the N first modulated signals; and
perform frequency relocation on the N first modulated signals;
a first synthesizer coupled to the first frequency relocation circuit and configured to synthesize M first modulated digital signals of the N first modulated signals that have undergone frequency relocation into a first bandwidth modulated digital signal, wherein M is a positive integer less than or equal to N;
one to M digital to analog converters coupled to the first synthesizer and configured to:
receive the first bandwidth modulated digital signal; and
perform digital to analog conversion on the first bandwidth modulated digital signal to obtain a first modulated analog signal; and
a first up-conversion circuit coupled to the one to M digital to analog converters and configured to:
receive the first modulated analog signal; and
convert the first modulated analog signal into a first radio frequency signal so that the first radio frequency signal is sent by an antenna,
wherein the receiver comprises:
a down-conversion circuit configured to convert a second radio frequency signal received on a receiving antenna into a second modulated analog signal;
an intermediate frequency power divider coupled to the down-conversion circuit and configured to decompose the second modulated analog signal into N parallel modulated sub analog signal flows;
a second frequency relocation circuit coupled to the intermediate frequency power divider and configured to perform frequency relocation on the N parallel modulated sub analog signal flows;
N analog to digital converters coupled to the second frequency relocation circuit and configured to perform analog to digital conversion on the N parallel modulated sub analog signal flows respectively to obtain N parallel modulated digital signal flows; and
a digital demodulation circuit coupled to the N analog to digital converters and configured to perform demodulation processing on the N parallel modulated digital signal flows to obtain N parallel demodulated signals, and
wherein the digital interface circuit is coupled to the digital demodulation circuit and configured to synthesize the N parallel demodulated signals into the first data.

2. The communication system according to claim 1, wherein the transmitter further comprises a second synthesizer coupled to the first frequency relocation circuit and the one to M digital to analog converters and configured to synthesize L first modulated signals of the N first modulated signals that have undergone frequency relocation into a second bandwidth signal, wherein the L first modulated signals are different from the M first modulated signals, wherein L is a positive integer, wherein a sum of L and M is less than or equal to N, wherein the one to M digital to analog converters comprise a second digital to analog converter configured to:
receive the second bandwidth signal; and
perform digital to analog conversion on the second bandwidth signal to obtain a third analog signal, and
wherein the first up-conversion circuit is further configured to:
receive the first modulated analog signal and the third analog signal; and
synthesize the first modulated analog signal and the third analog signal into the first radio frequency signal.

3. The communication system according to claim 2, wherein the first up-conversion circuit is further configured to perform frequency relocation on the first modulated analog signal and the third analog signal respectively before synthesizing the first modulated analog signal and the third analog signal into the first radio frequency signal.

4. The communication system according to claim 1, wherein the digital interface circuit is further configured to:
obtain, in the predetermined bandwidth, second data to be sent; and
decompose the second data into N parallel second sub digital signal flows,
wherein a bandwidth occupied by each second sub digital signal flow of the N parallel second sub digital signal flows is less than the predetermined bandwidth,
wherein the digital modulation circuit is further configured to:
receive the N parallel second sub digital signal flows; and
modulate the N parallel second sub digital signal flows to obtain N second modulated signals, and
wherein the transmitting circuit further comprises:
a second frequency relocation circuit coupled to the digital modulation circuit and configured to:
receive the N second modulated signals; and
perform frequency relocation on the N second modulated signals;
a second synthesizer coupled to the second frequency relocation circuit and configured to synthesize P signals of the N second modulated signals that have undergone frequency relocation into a second bandwidth signal, wherein P is a positive integer less than or equal to N, and wherein the one to M digital to analog converters comprise a second digital to analog converter coupled to the second synthesizer and configured to:

receive the second bandwidth signal; and
perform digital to analog conversion on the second bandwidth signal to obtain a third analog signal; and
a second up-conversion circuit coupled to the second synthesizer and configured to:
receive the third analog signal; and
convert the third analog signal into a third radio frequency signal so that the third radio frequency signal is sent by a second antenna.

5. The communication system according to claim 4, wherein the digital modulation circuit comprises N modulators, wherein the N modulators modulate the N first sub digital signal flows respectively, and wherein the N modulators are further configured to modulate the N second sub digital signal flows.

6. The communication system according to claim 1, wherein the antenna is a dual-polarized antenna, wherein the dual-polarized antenna comprises an H-polarized antenna and a V-polarized antenna, wherein the digital interface circuit is further configured to:
obtain, in the predetermined bandwidth, second data to be sent; and
decompose the second data into K parallel second sub digital signal flows, wherein a bandwidth occupied by each second sub digital signal flow of the K second sub digital signal flows is less than the predetermined bandwidth and K is a positive integer,
wherein the transmitting circuit further comprises:
a second digital modulation circuit coupled to the digital interface circuit and configured to:
receive the K second sub digital signal flows; and
modulate the K second sub digital signal flows on the V-polarized antenna to obtain K second modulated signals, wherein K is a positive integer greater than 1;
a second frequency relocation circuit coupled to the second digital modulation circuit and configured to:
receive the K second modulated signals; and
perform frequency relocation on the K second modulated signals;
a second synthesizer coupled to the second frequency relocation circuit and configured to synthesize at least two signals of the K second modulated signals that have undergone frequency relocation into a second bandwidth signal;
a second digital to analog converter coupled to the second synthesizer and configured to:
receive the second bandwidth signal; and
perform digital to analog conversion on the second bandwidth signal to obtain a third analog signal, wherein M is less than or equal to N−1;
a second up-conversion circuit coupled to the second digital to analog converter and configured to:
receive the third analog signal; and
convert the third analog signal into a third radio frequency signal; and
a coupler coupled to the first up-conversion circuit and the second up-conversion circuit and configured to couple the first radio frequency signal and the third radio frequency signal so that the first radio frequency signal and the third radio frequency signal are sent by the dual-polarized antenna respectively, and
wherein the first radio frequency signal is sent by the H-polarized antenna and the third radio frequency signal is sent by the V-polarized antenna.

7. The communication system according to claim 6, wherein the digital modulation circuit comprises N+K modulators, wherein the N modulators modulate the N first sub digital signal flows respectively, and wherein the K modulators modulate the K second sub digital signal flows respectively.

8. The communication system according to claim 1, wherein the first synthesizer comprises an adder, wherein the adder is configured to add the N first modulated signals that have undergone frequency relocation to synthesize the N first modulated signals into the first bandwidth modulated digital signal.

9. The communication system according to claim 1, wherein N is at least 4 and the first data is at least one binary digital signal flow.

10. A method for communication, comprising a method for transmitting data and a method for receiving data,
wherein the method for transmitting data comprises:
obtaining, in a predetermined bandwidth, first data to be sent;
decomposing the first data into N parallel first sub digital signal flows, wherein a bandwidth occupied by each first sub digital signal flow of the N parallel first sub digital signal flows is less than the predetermined bandwidth and N is a positive integer greater than 1;
modulating the N parallel first sub digital signal flows to obtain N first modulated signals;
performing frequency relocation on the N first modulated signals;
synthesizing M first modulated digital signals of the N first modulated signals that have undergone frequency relocation into a first bandwidth modulated digital signal, wherein M is a positive integer less than or equal to N;
performing digital to analog conversion on the first bandwidth modulated digital signal to obtain a first modulated analog signal; and
converting the first modulated analog signal into a first radio frequency signal, so that the first radio frequency signal is sent by an antenna, and wherein the method for receiving data comprises:
converting a second radio frequency signal received on a receiving antenna into a second modulated analog signal;
decomposing the second modulated analog signal into N parallel modulated sub analog signal flows;
performing frequency relocation on the N parallel modulated sub analog signal flows;
performing analog to digital conversion on the N parallel modulated sub analog signal flows respectively to obtain N parallel modulated digital signal flows;
performing demodulation processing on the N parallel modulated digital signal flows to obtain N parallel demodulated signals; and
synthesizing the N parallel demodulated signals into the first data.

11. The method according to claim 10, wherein the method for transmitting data further comprises:
synthesizing L first modulated signals of the N first modulated signals that have undergone frequency relocation into a second bandwidth signal, wherein the L first modulated signals are different from the M first modulated signals, wherein L is a positive integer, and wherein a sum of L and M is less than or equal to N;

performing digital to analog conversion on the second bandwidth signal to obtain a third analog signal; and synthesizing the first modulated analog signal and the third analog signal into the first radio frequency signal.

12. The method according to claim 11, wherein the method for transmitting data further comprises performing frequency relocation on the first modulated analog signal and the third analog signal respectively before synthesizing the first modulated analog signal and the third analog signal into the first radio frequency signal.

13. The method according to claim 10, wherein the method for transmitting data further comprises:
obtaining, in the predetermined bandwidth, second data to be sent;
decomposing the second data into N parallel second sub digital signal flows, wherein a bandwidth occupied by each second sub digital signal flow of the N second sub digital signal flows is less than the predetermined bandwidth;
modulating the N second sub digital signal flows to obtain N second modulated signals;
performing frequency relocation on the N second modulated signals;
synthesizing P signals of the N second modulated signals that have undergone frequency relocation into a second bandwidth signal, wherein P is a positive integer less than or equal to N;
performing digital to analog conversion on the second bandwidth signal to obtain a third analog signal; and
converting the third analog signal into a third radio frequency signal so that the third radio frequency signal is sent by a second antenna.

14. The method according to claim 13, wherein modulating the N first sub digital signal flows comprises modulating the N first sub digital signal flows respectively using N modulators, and wherein modulating the N second sub digital signal flows comprises modulating the N second sub digital signal flows respectively using the N modulators.

15. The method according to claim 12, wherein the antenna is a dual-polarized antenna, wherein the dual-polarized antenna comprises an H-polarized antenna and a V-polarized antenna, wherein the method for transmitting data further comprises:
obtaining, in the predetermined bandwidth, second data to be sent;
decomposing the second data into K parallel second sub digital signal flows, wherein a bandwidth occupied by each second sub digital signal flow of the K second sub digital signal flows is less than the predetermined bandwidth and K is a positive integer greater than 1;
modulating the K second sub digital signal flows on the V-polarized antenna to obtain K second modulated signals;
performing frequency relocation on the K second modulated signals;
synthesizing at least two signals of the K second modulated signals that have undergone frequency relocation into a second bandwidth signal;
performing digital to analog conversion on the second bandwidth signal to obtain a third analog signal;
receiving the third analog signal;
converting the third analog signal into a third radio frequency signal; and
coupling the first radio frequency signal and the third radio frequency signal, so that the first radio frequency signal and the third radio frequency signal are sent by the dual-polarized antenna respectively, and
wherein the first radio frequency signal is sent by the H-polarized antenna and the third radio frequency signal is sent by the V-polarized antenna.

16. The method according to claim 15, wherein the modulating the N first sub digital signal flows comprises modulating the N first sub digital signal flows respectively using N modulators, and wherein the modulating the K second sub digital signal flows comprises modulating the K second sub digital signal flows respectively using K modulators.

17. The method according to claim 12, wherein the synthesizing M first modulated signals of the N first modulated signals that have undergone frequency relocation into the first bandwidth modulated digital signal comprises adding, using an adder, the N first modulated signals that have undergone frequency relocation to synthesize the N first modulated signals into the first bandwidth modulated digital signal.

18. The method according to claim 12, wherein N is at least 4 and the first data is at least one binary digital signal flow.

19. The communication system according to claim 1, wherein there is no frequency band gap between adjacent first modulated signals of the N first modulated signals that have undergone frequency relocation.

20. The method according to claim 10, wherein there is no frequency band gap between adjacent first modulated signals of the N first modulated signals that have undergone frequency relocation.

21. The system according to claim 1, wherein the communication system is a high-speed millimetric wave system.

22. The method according to claim 10, wherein the method applies to a high-speed millimetric wave system.

* * * * *